United States Patent
Huang

(10) Patent No.: US 12,245,100 B2
(45) Date of Patent: Mar. 4, 2025

(54) SIDELINK POSITIONING METHOD AND APPARATUS

(71) Applicant: Huawei Technologies Co., Ltd., Shenzhen (CN)

(72) Inventor: Su Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 327 days.

(21) Appl. No.: 17/663,729

(22) Filed: May 17, 2022

(65) Prior Publication Data
US 2022/0279313 A1 Sep. 1, 2022

Related U.S. Application Data

(63) Continuation of application No. PCT/CN2019/119114, filed on Nov. 18, 2019.

(51) Int. Cl.
*H04W 4/029* (2018.01)
*H04L 5/00* (2006.01)
*H04W 72/044* (2023.01)

(52) U.S. Cl.
CPC ........... *H04W 4/029* (2018.02); *H04L 5/0051* (2013.01); *H04W 72/044* (2013.01)

(58) Field of Classification Search
CPC ........................... H04W 4/029; H04W 72/044
(Continued)

(56) References Cited

U.S. PATENT DOCUMENTS

| | | | |
|---|---|---|---|
| 2016/0095092 A1* | 3/2016 | Khoryaev | G01S 5/0289 370/329 |
| 2017/0212206 A1 | 7/2017 | Kim et al. | |

(Continued)

FOREIGN PATENT DOCUMENTS

| | | |
|---|---|---|
| CN | 105589506 A | 5/2016 |
| CN | 106664518 A | 5/2017 |

(Continued)

OTHER PUBLICATIONS

3GPP TS 38.305 V15.4.0. (Jun. 2019), 3rd Generation Partnership Project; Technical Specification Group Radio Access Network; NG Radio Access Network (NG-RAN); Stage 2 functional specification of User Equipment (UE) positioning in NG-RAN (Release 15), 72 pages.

(Continued)

*Primary Examiner* — Qutbuddin Ghulamali
(74) *Attorney, Agent, or Firm* — Slater Matsil, LLP

(57) ABSTRACT

This application provides a sidelink positioning method and apparatus. The method may include: A first terminal device receives a first sidelink positioning configuration sent by a network device. The first terminal device sends a first sidelink positioning reference signal to a second terminal device based on the first sidelink positioning configuration, where a position of the first terminal device is determined based on a first measurement value and a position of the second terminal device, and the first measurement value includes a measurement value of the second terminal device on the first sidelink positioning reference signal. According to this method for performing positioning between terminal devices by using a sidelink reference signal, a relative position or an absolute position between terminal devices may be obtained.

16 Claims, 11 Drawing Sheets

(58) Field of Classification Search
USPC .................................................. 455/456.6
See application file for complete search history.

(56) References Cited

U.S. PATENT DOCUMENTS

2019/0090092 A1    3/2019  Hwang et al.
2019/0149365 A1*  5/2019  Chatterjee .......... H04L 25/0226
                                                                         370/329

FOREIGN PATENT DOCUMENTS

CN        110289896 A    9/2019
CN        110383862 A    10/2019

OTHER PUBLICATIONS

Huawei et al., "Considerations on NR Positioning", 3GPP TSG RAN WG1 Meeting #94, R1-1809348, Gothenburg, Sweden, Aug. 20-24, 2018, 9 pages.
Intel Corporation, "Potential RAT Dependent Techniques for NR Positioning", 3GPP TSG RAN WG1 Meeting #95, R1-1812519, Spokane, WA, US, Nov. 12-16, 2018, 16 pages.

* cited by examiner

SIDELINK POSITIONING METHOD AND APPARATUS

CROSS-REFERENCE TO RELATED APPLICATIONS

This application is a continuation of International Application No. PCT/CN2019/119114, filed on Nov. 18, 2019, the disclosure of which is hereby incorporated by reference in its entirety.

TECHNICAL FIELD

This application relates to the communication field, and specifically, to a sidelink positioning method and apparatus.

BACKGROUND

In some existing positioning technologies, position information of a terminal device is determined based on reference signal measurement between a network device and the terminal device. These positioning technologies all need to be controlled by a core network, and a positioning error of the terminal device increases as a distance between the network device and the terminal device increases. In some scenarios of requiring high positioning accuracy, because there is a large error in this positioning method that is based on a relationship between the network device and the terminal device, the position information of the terminal device cannot be accurately measured.

In this case, how to use these positioning technologies in these scenarios of requiring high positioning accuracy becomes an urgent problem to be resolved.

SUMMARY

This application provides a sidelink positioning method and apparatus. Terminal devices may determine a position by using a sidelink signal to obtain a relative position or an absolute position, so that positioning accuracy is improved.

According to a first aspect, a sidelink positioning method is provided. The method includes: A first terminal device receives a first sidelink positioning configuration sent by a network device. The first terminal device sends a first sidelink positioning reference signal to a second terminal device based on the first sidelink positioning configuration, where the first sidelink positioning reference signal is used to determine a first measurement value, the first measurement value includes a measurement value of the second terminal device on the first sidelink positioning reference signal, and a position of the first terminal device is determined based on the first measurement value and a position of the second terminal device.

In the foregoing technical solution, the second terminal device measures the first sidelink positioning reference signal sent by the first terminal device, to obtain the first measurement value, and therefore may determine a position relationship of the first terminal device relative to the second terminal device. Position information of the first terminal device may be determined by the first terminal device or the network device based on the first measurement value and position information of the second terminal device, and the first measurement value does not need to be transmitted through a core network, so that a positioning latency is reduced. In addition, the technical solution is further applicable to the first terminal device that does not support sidelink reference signal measurement, and the second terminal device that supports a sidelink reference signal measurement performs measurement.

With reference to the first aspect, in some implementations of the first aspect, the first terminal device receives the first measurement value from the second terminal device or the network device, and the first terminal device determines the position of the first terminal device based on the first measurement value and the position of the second terminal device.

In the foregoing technical solution, the first terminal device may calculate the position information of the first terminal device based on the first measurement value.

With reference to the first aspect, in some implementations of the first aspect, the first terminal device receives, based on the first sidelink positioning configuration, a second sidelink positioning reference signal sent by the second terminal device; the first terminal device measures the second sidelink positioning reference signal to determine and obtain a second measurement value; and that the first terminal device determines the position of the first terminal device based on the first measurement value and the position of the second terminal device includes: The first terminal device determines the position of the first terminal device based on the first measurement value, the second measurement value, and the position of the second terminal device.

In the foregoing technical solution, the first terminal device determines the position relationship of the first terminal device relative to the second terminal device based on both the first measurement value on the first sidelink positioning reference signal measured by the second terminal device and the second measurement value on the second sidelink positioning reference signal measured by the first terminal device. Then, the position of the first terminal device is finally determined based on the position of the second terminal device after a relative position relationship between the first terminal device and the second terminal device is determined, and the first measurement value and the second measurement value do not need to be transmitted through the core network, so that the positioning latency is reduced.

With reference to the first aspect, in some implementations of the first aspect, before that a first terminal device receives a first sidelink positioning configuration sent by a network device, the method further includes: The first terminal device sends a position information request to the network device.

With reference to the first aspect, in some implementations of the first aspect, the first sidelink positioning configuration information includes at least one or more of the following information configurations: a time-frequency resource occupied by the first sidelink positioning reference signal, a time-frequency resource occupied by the second sidelink positioning reference signal, sequence information of the first sidelink positioning reference signal, sequence information of the second sidelink positioning reference signal, information about the second terminal device, and reporting configuration information of the first terminal device, where the reporting configuration information of the first terminal device includes the second measurement value and a Uu interface measurement reporting method.

With reference to the first aspect, in some implementations of the first aspect, the first measurement value includes a Rx–Tx time difference of the second terminal device and a measurement value of the second terminal device on an angle of arrival of the first sidelink positioning reference signal.

With reference to the first aspect, in some implementations of the first aspect, the second measurement value includes a Rx–Tx time difference of the first terminal device and a measurement value of the first terminal device on an angle of arrival of the second sidelink positioning reference signal.

According to a second aspect, a sidelink positioning method is provided. The method includes: A second terminal device receives a second sidelink positioning configuration sent by a network device. The second terminal device receives, based on the second sidelink positioning configuration, a first sidelink positioning reference signal sent by a first terminal device. The second terminal device determines and obtains a first measurement value based on the first sidelink positioning reference signal. The second terminal device sends the first measurement value to the network device, so that the network device determines a position of the first terminal device based on the first measurement value and a position of the second terminal device. Alternatively, the second terminal device sends the first measurement value to the first terminal device, so that the first terminal device determines a position of the first terminal device based on the first measurement value and a position of the second terminal device.

In the foregoing technical solution, the second terminal device measures the first sidelink positioning reference signal sent by the first terminal device, to obtain the first measurement value, and therefore determines a position relationship of the first terminal device relative to the second terminal device. Both the first terminal device and the network device may determine position information of the first terminal device based on the first measurement value and position information of the second terminal device. The measurement value does not need to be transmitted through a core network, so that a positioning latency is reduced. In addition, the technical solution is further applicable to the first terminal device that does not support sidelink reference signal measurement, and the second terminal device that supports a sidelink reference signal measurement performs measurement.

With reference to the second aspect, in some implementations of the second aspect, the second terminal device sends a second sidelink positioning reference signal to the first terminal device based on the second sidelink positioning configuration.

With reference to the second aspect, in some implementations of the second aspect, the second sidelink positioning configuration includes one or more of the following information: a time-frequency resource occupied by the first sidelink positioning reference signal, a time-frequency resource occupied by the second sidelink positioning reference signal, sequence information of the first sidelink positioning reference signal, sequence information of the second sidelink positioning reference signal, information about the second terminal device, and reporting configuration information of the second terminal device, where the reporting configuration information of the second terminal device includes the first measurement value and a PC5 interface measurement reporting method.

With reference to the second aspect, in some implementations of the second aspect, the first measurement value includes a Rx–Tx time difference of the second terminal device and a measurement value of the second terminal device on an angle of arrival of the first sidelink positioning reference signal.

With reference to the second aspect, in some implementations of the second aspect, the second terminal device sends the position information of the second terminal device to the network device or the first terminal device.

According to a third aspect, a sidelink positioning method is provided. The method includes: A network device sends a first sidelink positioning configuration to a first terminal device. The network device sends a second sidelink positioning configuration to a second terminal device. The network device receives a first measurement value sent by the second terminal device, where the first measurement value includes a measurement value of the second terminal device on a first sidelink positioning reference signal. The network device determines a position of the first terminal device based on the first measurement value and a position of the second terminal device.

In the foregoing technical solution, the second terminal device measures the first sidelink positioning reference signal sent by the first terminal device, to obtain the first measurement value, and therefore determines a position relationship of the first terminal device relative to the second terminal device. The network device may determine position information of the first terminal device based on the first measurement value and position information of the second terminal device. The measurement value does not need to be transmitted through a core network, so that a positioning latency is reduced.

With reference to the third aspect, in some implementations of the third aspect, the network device receives a second measurement value sent by the first terminal device, where the second measurement value includes a measurement value of the first terminal device on a second sidelink positioning reference signal sent by the second terminal device; and that the network device determines a position of the first terminal device based on the first measurement value and a position of the second terminal device includes: The network device determines the position of the first terminal device based on the first measurement value, the second measurement value, and the position of the second terminal device.

In the foregoing technical solution, the position relationship of the first terminal device relative to the second terminal device may be determined based on both the first measurement value and the second measurement value. Then, the position of the first terminal device is finally determined based on the position of the second terminal device after a relative position relationship between the first terminal device and the second terminal device is determined, and the first measurement value and the second measurement value do not need to be transmitted through the core network, so that the positioning latency is reduced.

With reference to the third aspect, in some implementations of the third aspect, before that a network device sends a first sidelink positioning configuration to a first terminal device and the network device sends a second sidelink positioning configuration to a second terminal device, the method further includes: The network device receives a position information request of the first terminal device.

With reference to the third aspect, in some implementations of the third aspect, the first sidelink positioning configuration information includes one or more of the following configurations: a time-frequency resource occupied by the first sidelink positioning reference signal, a time-frequency resource occupied by the second sidelink positioning reference signal, sequence information of the first sidelink positioning reference signal, sequence information of the second sidelink positioning reference signal, information about the second terminal device, and reporting configuration information of the first terminal device, where the reporting configuration information of the first terminal device includes the second measurement value and a Uu interface measurement reporting method.

With reference to the third aspect, in some implementations of the third aspect, the second sidelink positioning configuration information includes one or more of the following configurations: the time-frequency resource occupied by the first sidelink positioning reference signal, the time-frequency resource occupied by the second sidelink positioning reference signal, the sequence information of the first sidelink positioning reference signal, the sequence information of the second sidelink positioning reference signal, the information of the second terminal device, and reporting configuration information of the second terminal device, where the reporting configuration information of the second terminal device includes the first measurement value and a PC5 interface measurement reporting method.

With reference to the third aspect, in some implementations of the third aspect, the first measurement value includes a Rx–Tx time difference of the second terminal device and a measurement value of the second terminal device on an angle of arrival of the first sidelink positioning reference signal.

With reference to the third aspect, in some implementations of the third aspect, the second measurement value includes a Rx–Tx time difference of the first terminal device and a measurement value of the first terminal device on an angle of arrival of the second sidelink positioning reference signal.

With reference to the third aspect, in some implementations of the third aspect, the method further includes: The network device receives the position information of the second terminal device sent by the second terminal device.

According to a fourth aspect, a sidelink positioning apparatus is provided, including modules or units configured to perform the method according to any one of the first aspect or the second aspect and the possible implementations of the first aspect or the second aspect.

According to a fifth aspect, a sidelink positioning apparatus is provided, including a processor. The processor is coupled to a memory, and may be configured to perform the method according to any one of the first aspect or the second aspect and the possible implementations of the first aspect or the second aspect. Optionally, the sidelink positioning apparatus further includes the memory. Optionally, the sidelink positioning apparatus further includes a communication interface, and the processor is coupled to the communication interface.

In an implementation, the sidelink positioning apparatus is a terminal device. When the sidelink positioning apparatus is the terminal device, the communication interface may be a transceiver or an input/output interface.

In another implementation, the sidelink positioning apparatus is a chip or a chip system. When the sidelink positioning apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a sixth aspect, a sidelink positioning apparatus is provided, including modules or units configured to perform the method according to any one of the third aspect and the possible implementations of the third aspect.

According to a seventh aspect, a sidelink positioning apparatus is provided, including a processor. The processor is coupled to a memory, and may be configured to execute instructions in the memory, to implement the method according to any one of the third aspect and the possible implementations of the third aspect. Optionally, the sidelink positioning apparatus further includes the memory. Optionally, the sidelink positioning apparatus further includes a communication interface, and the processor is coupled to the communication interface. Optionally, a transceiver may be a transceiver circuit. Optionally, an input/output interface may be an input/output circuit.

In an implementation, the sidelink positioning apparatus is a network device. When the sidelink positioning apparatus is the network device, the communication interface may be a transceiver or an input/output interface. Optionally, the transceiver may be a transceiver circuit. Optionally, the input/output interface may be an input/output circuit.

In another implementation, the sidelink positioning apparatus is a chip or a chip system. When the sidelink positioning apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to an eighth aspect, a processor is provided, and includes an input circuit, an output circuit, and a processing circuit. The processing circuit is configured to: receive a signal by using the input circuit, and transmit a signal by using the output circuit, so that the method according to any one of the first aspect to the third aspect and the possible implementations of the first aspect to the third aspect is implemented.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to a ninth aspect, a processing apparatus is provided, and includes a processor and a memory. The processor is configured to: read instructions stored in the memory, receive a signal through a receiver, and transmit a signal through a transmitter, to perform the method according to any one of the first aspect to the third aspect and the possible implementations of the first aspect to the third aspect.

Optionally, there are one or more processors, and there are one or more memories.

Optionally, the memory may be integrated with the processor, or the memory and the processor are disposed separately.

In a specific implementation process, the memory may be a non-transitory (non-transitory) memory, for example, a read-only memory (read-only memory, ROM). The memory and the processor may be integrated on a same chip, or may be separately disposed on different chips. A type of the memory and a manner of disposing the memory and the processor are not limited in this embodiment of this application.

It should be understood that a related data exchange process, for example, sending indication information, may be a process of outputting the indication information from the processor, and receiving capability information, may be a process of receiving the input capability information by the processor. Specifically, data output by the processor may be output to the transmitter, and input data received by the processor may be from the receiver. The transmitter and the receiver may be collectively referred to as a transceiver.

The processor according to the ninth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may exist independently outside the processor.

According to a tenth aspect, a computer program product is provided. The computer program product includes a computer program (which may be also referred to as code or instructions). When the computer program is run, a computer is enabled to perform the method according to any one of the first aspect to the third aspect and the possible implementations of the first aspect to the third aspect.

According to an eleventh aspect, a computer-readable storage medium is provided. The computer-readable storage medium stores a computer program (which may also be referred to as code or instructions). When the computer program is run on a computer, the computer is enabled to perform the method according to any one of the first aspect to the third aspect and the possible implementations of the first aspect to the third aspect.

According to a twelfth aspect, a communication system is provided. The communication system includes the foregoing network device and the foregoing terminal device.

DETAILED DESCRIPTION OF ILLUSTRATIVE EMBODIMENTS

The following describes technical solutions of this application with reference to the accompanying drawings.

The technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a 5th generation (5th generation, 5G) system, a new radio (new radio, NR) system, vehicle-to-everything (vehicle-to-X V2X), or a next-generation communication technology such as 6G. The V2X may include vehicle-to-network (vehicle-to-network, V2N), vehicle-to-vehicle (vehicle-to-vehicle, V2V), vehicle-to-infrastructure (vehicle-to-infrastructure, V2I), vehicle-to-pedestrian (vehicle-to-pedestrian, V2P), long term evolution-vehicle (long term evolution-vehicle, LTE-V), the internet of vehicles, machine type communication (machine type communication, MTC), the internet of things (internet of things, IoT), long term evolution-machine (long term evolution-machine, LTE-M), machine-to-machine (machine-to-machine, M2M), and the like.

Figure 1:
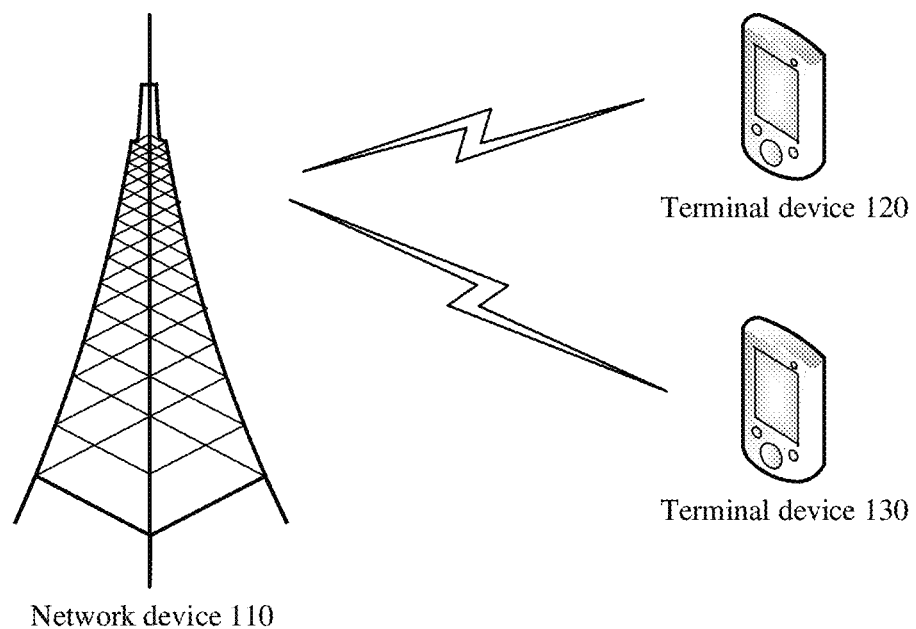
FIG. 1 is a schematic diagram of a network architecture applicable to an embodiment of this application.

FIG. 1 is a schematic diagram of a network architecture according to an embodiment of this application. As shown in FIG. 1, a communication system in this embodiment of this application may include a network device and a plurality of terminal devices. The network device may include one or more antennas. In addition, the network device may additionally include a transmitter chain and a receiver chain. A person of ordinary skill in the art may understand that the transmitter chain and the receiver chain each may include a plurality of components (such as a processor, a modulator, a multiplexer, a demodulator, a demultiplexer, or an antenna) related to signal sending and receiving.

The network device may communicate with the plurality of terminal devices. The terminal device in this embodiment of this application may also be referred to as user equipment (user equipment, UE), a mobile station (mobile station, MS), a mobile terminal (mobile terminal, MT), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device or a vehicle-mounted device that has a wireless connection function. Currently, some examples of the terminal device are a mobile phone (mobile phone), a tablet computer, a laptop computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless telephone set, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a future 5G network, a terminal device in a future evolved public land mobile network (public land mobile network, PLMN), and/or any other suitable device configured to perform communication in a wireless communication system. This is not limited in this embodiment of this application.

The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is not only a hardware device, but also a device configured to implement a powerful function through software support, data exchange, and cloud interaction. Generalized wearable intelligent devices include full-featured and large-size devices that can implement complete or partial functions without depending on smartphones, for example, smartwatches or smart glasses, and devices that focus on only one type of application functions and need to work with other devices such as smartphones, for example, various smart bands or smart jewelries for monitoring physical signs.

In addition, the terminal device in this embodiment of this application may alternatively be a terminal device in an internet of things system. IoT is an important part of future development of information technologies. A main technical feature of the IoT is connecting a thing to a network by using a communication technology, to implement an intelligent network for interconnection between a person and a machine or between things.

In addition, in this embodiment of this application, the terminal device may further include a sensor, for example, an intelligent printer, a train detector, or a gas station. Main functions of the terminal device include collecting data (by some terminal devices), receiving control information and downlink data from a network device, sending an electromagnetic wave, and transmitting uplink data to the network device.

The network device in this embodiment of this application may be a device configured to communicate with a terminal device. The network device may be an evolved NodeB (evolved NodeB, eNB, or eNodeB) in an LTE system, a radio controller in a cloud radio access network (cloud radio access network, CRAN) scenario, a radio network controller (radio network controller, RNC), a base station controller (base station controller, BSC), a home base station (for example, a home evolved NodeB or a home NodeB, HNB), or a baseband unit (baseband unit, BBU). Alternatively, the network device may be a relay station, an access point, a vehicle-mounted device, a wearable device, a network device in a future 5G network, or a network device in a future evolved PLMN network, or may be an access point (access point, AP) in a wireless local area network (wireless local area network, WLAN), a wireless relay node, a wireless backhaul node, a transmission point (transmission point, TP), or a transmission reception point (transmission and reception point, TRP), or may be a gNB or a transmission point (TRP or TP) in a new radio (new radio, NR) system, one antenna panel or a group of antenna panels (including a plurality of antenna panels) of a base station in a 5G system, or a network node constituting a gNB or a transmission point, for example, a baseband unit (BBU) or a distributed unit (distributed unit, DU). This is not limited in this embodiment of this application.

In some deployments, the gNB may include a centralized unit (centralized unit, CU) and a DU. The gNB may further include an active antenna unit (active antenna unit, AAU for short). The CU implements some functions of the gNB, and the DU implements some other functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified as a network device in an access network (radio access network, RAN), or may be classified as a network device in a core network (core network, CN). This is not limited in this application.

In addition, in this embodiment of this application, the network device provides a service for a cell, and the terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell (small cell). The small cell herein may include a metro cell (metro cell), a micro cell (micro cell), a pico cell (pico cell), a femto cell (femto cell), and the like. The small cells are characterized by small coverage and a low transmit power, and are applicable to providing a high-rate data transmission service.

It should be noted that a cell may be understood as an area within coverage of radio signals of the network device.

In addition, in this embodiment of this application, the network device may include a base station (gNB), for example, a macro base station, a micro base station, an indoor hotspot, or a relay node, and has functions of: sending a radio wave to the terminal device, to implement downlink data transmission on one the hand and control uplink transmission by sending scheduling information on the other hand, and receiving a radio wave sent by the terminal device, to receive uplink data transmission.

In this embodiment of this application, the terminal device or the network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (which is also referred to as a main memory). An operating system may be any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant communication software. In addition, a specific structure of an execution body of a method provided in embodiments of this application is not specifically limited in embodiments of this application provided that a program that records code for the method provided in embodiments of this application can be run to perform communication according to the method provided in embodiments of this application. For example, the method provided in embodiments of this application may be performed by the terminal device or the network device, or may be performed by a functional module that is in the terminal device or the network device and that can invoke and execute a program.

In addition, aspects or features in embodiments of this application may be implemented as a method, an apparatus, or a product that uses standard programming and/or engineering technologies. The term "product" used in embodiments of this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card and a flash memory component (for example, and an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain and/or carry instructions and/or data.

It should be noted that in this embodiment of this application, a plurality of application programs may be run at the application layer. In this case, an application program for performing the communication methods in embodiments of this application and an application program used to control a receive end device to implement an action corresponding to received data may be different application programs.

The terminal device communicates with the network device. The network device may send information to the terminal device through a forward link (which is also referred to as a downlink), and receive information from the terminal device through a reverse link (which is also referred to as an uplink).

For example, in a frequency division duplex (frequency division duplex, FDD) system, for example, the forward link and the reverse link may use different frequency bands.

For another example, in a time division duplex (time division duplex, TDD) system and a full-duplex (full-duplex) system, the forward link and the reverse link may use a same frequency band.

At a given time, the network device or the terminal device may be a wireless communication sending apparatus and/or a wireless communication receiving apparatus. When sending data, the wireless communication sending apparatus may encode data for transmission. Specifically, the wireless communication sending apparatus may obtain (for example, generate, receive from another communication apparatus, or store in a memory) a specific quantity of data bits that are to be sent to the wireless communication receiving apparatus through a channel. The data bits may be included in a transport block (or a plurality of transport blocks) of the data, and the transport block may be segmented to generate a plurality of code blocks.

In addition, the communication system may be a PLMN network, a device-to-device (device-to-device, D2D) network, a machine-to-machine (machine-to-machine, M2M) network, an IoT network, or another network. FIG. 1 is merely an example of a simplified schematic diagram. The network may further include another network device, which is not shown in FIG. 1.

Currently, positioning in LTE and NR Rel-16 is based on an architecture that is controlled by a core network location management function (location management function, LMF) and assisted by an access network and a terminal.

In this positioning architecture, downlink positioning is used as an example. The LMF mainly performs the following operations:

(1) exchanging cell information with an ng-eNB/a gNB, for example, obtaining positioning reference signal (positioning reference signal, PRS) configuration information, sounding reference signal (sounding reference signal, SRS) configuration information, cell timing, and cell position information;

(2) transferring UE capability information, assistance information, measurement information, and the like with UE; and (3) transferring measurement information and the like with a gNB.

Based on the cell information, measurement reporting performed by the UE on a downlink signal of each cell, and measurement reporting performed in each cell on an uplink signal of the UE, for example, in the following positioning technologies, the LMF may determine position information of the UE:

A downlink time difference of arrival (downlink time difference of arrival, DL-TDOA) positioning technology means that the UE measures a reference signal time difference (reference signal time difference, RSTD) on a PRS signal of each cell, and reports a measurement result to the LMF.

An uplink time difference of arrival (uplink time difference of arrival, UL-TDOA) positioning technology means that uplink relative time of arrival (uplink relative time of arrival, UL-RTOA) is measured in each cell on an SRS signal of the UE and a measurement result is reported to the LMF.

A downlink angle-of-departure (downlink angle-of-departure, DL-AoD) positioning technology means that the UE measures a positioning reference signal-reference signal received power (positioning reference signal-reference signal received power, PRS-RSRP) on a PRS signal of each cell and reports a measurement result to the LMF.

An uplink angle-of-arrival (uplink azimuth angle-of-arrival, UL-AoA) positioning technology means that an AoA/a zenith angle of arrival (Zenith angle of arrival, ZoA) is measured in each cell on an SRS signal of the UE and a measurement result is reported to the LMF.

An enhanced cell ID (enhanced cell identity, E-CID) positioning technology means that the UE measures a synchronization signal based reference signal received power (synchronization signal-reference signal received power, SS-RSRP)/synchronization signal based reference signal received quality (synchronization signal-reference signal received quality, SS-RSRQ)/a synchronization signal based signal to interference plus noise ratio (synchronization signal-signal to interference plus noise ratio, SS-SINR) on a synchronization signal and physical broadcast channel block (synchronization signal and physical broadcast channel block, SSB) of each cell and reports a measurement result to the LMF.

A multi-round trip time (multi-round trip time, Multi-RTT) positioning technology means that the UE measures a UE Rx–Tx time difference (Rx–Tx time difference) on a PRS signal of each cell and reports a measurement result to the LMF; a gNB Rx–Tx time difference is measured in each cell on an SRS signal of the UE and a measurement result is reported to the LMF.

The following uses the UL-AoA positioning technology as an example to describe the positioning technology in detail.

A specific method of the UL-AoA positioning technology is that a terminal device sends an SRS, and a base station of a serving cell and a base station of a neighboring cell receive the SRS. When a receive antenna of the base station is in an array form and a transmitted signal passes through an antenna array, because a distance between each antenna in the array and a transmitting device is different, a signal phase difference occurs on a receiving device. The base station may estimate a relative direction of a signal based on a phase shift caused by a wave path difference between a plurality of antenna array elements, to determine a relative direction of the terminal.

Figure 2:
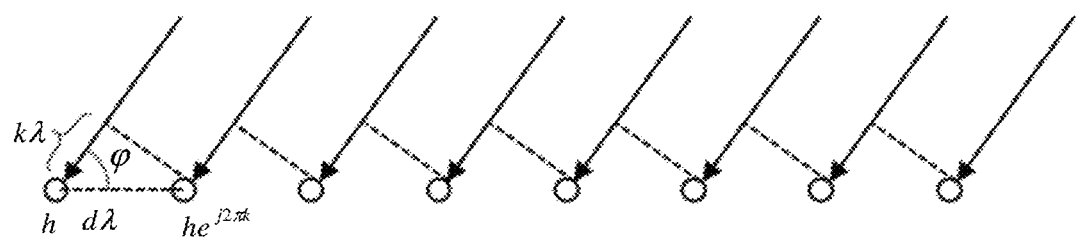
FIG. 2 is a schematic diagram of a relationship between an antenna array and an angle of arrival in a downlink angle-of-arrival positioning technology.

As shown in FIG. 2, for example, it is assumed that a base station antenna spacing is $d\lambda$, where $\lambda$ is a carrier wavelength, an included angle between an incoming direction that the SRS sent by the terminal device has when the base station receives the SRS and an antenna array is $\varphi$, and a wave path difference between adjacent antenna array elements is $k\lambda$, where $k = d \cdot \cos \varphi$. Therefore, a time difference of arrival of signals on the adjacent antenna array elements is $k\lambda/c = k/f_c$, where c is a velocity of light and $f_c$ is a carrier frequency. For a radio frequency signal:

$$x^{RF}(t) = x^{BB}(t)e^{j2\pi f_c t}$$

$x_{BB}(t)$ is a baseband signal. Based on this, a latency $k/f_c$ of the radio frequency signal is equivalent to introducing an extra phase, which is shown below:

$$x^{RF}\left(t - \frac{k}{f_c}\right) =$$

$$x^{BB}\left(t - \frac{k}{f_c}\right)e^{j2\pi f_c\left(t - \frac{k}{f_c}\right)} \cong x^{BB}(t)e^{j2\pi f_c\left(t - \frac{k}{f_c}\right)} = x^{BB}(t)e^{j2\pi f_c t - 2\pi k)} = x^{RF}(t)e^{-j2\pi k}$$

Herein, $$x^{BB}\left(t - \frac{k}{f_c}\right) \cong x^{BB}(t),$$

because impact of the latency $k/f_c$ on the baseband signal is negligible. Therefore, it may be determined that a signal phase difference between different antenna array elements is $e^{j2\pi k} = e^{j2\pi d \cos \varphi}$.

An angle positioning principle is that a phase difference between different antenna array elements at an uplink receive end of a base station is obtained to estimate an incoming direction φ through reverse calculation.

Figure 3:
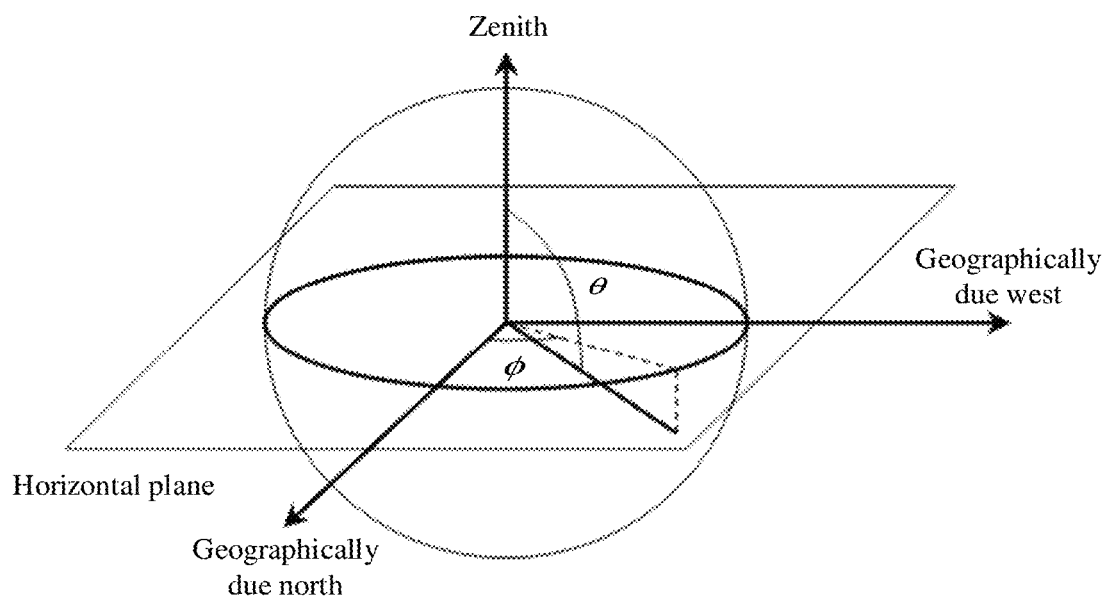
FIG. 3 is a schematic diagram of an azimuth angle of arrival and a zenith angle of arrival in a downlink angle-of-arrival positioning technology.

To describe a spatial angle, the 3rd generation partnership project (3rd generation partnership project, 3GPP) defines an azimuth angle of arrival and a zenith angle of arrival. The azimuth angle of arrival (AoA) is defined as an included angle between the terminal device and a geographically due north direction on a horizontal plane, where anti-clockwise rotation is positive, such as φ shown in FIG. 3. The zenith angle of arrival (ZoA) is defined as an included angle between a direction of the terminal device and a zenith direction, such as θ shown in FIG. 3.

Figure 4:
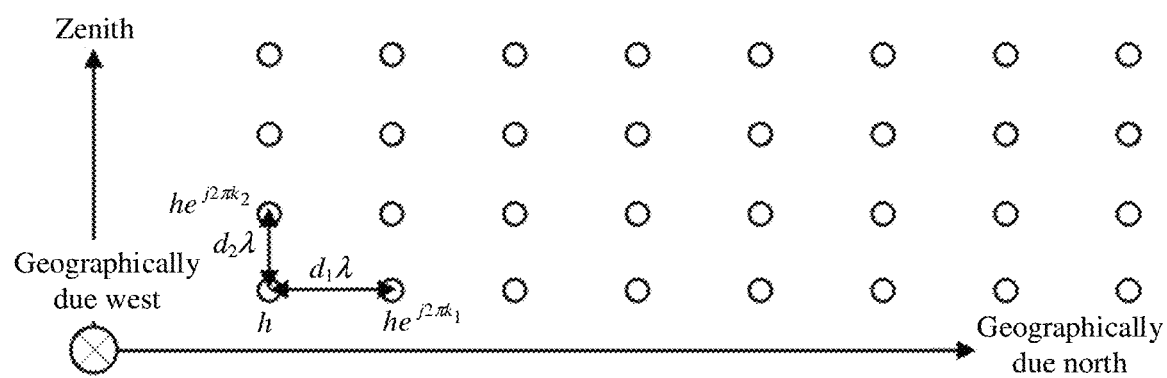
FIG. 4 is a schematic diagram of a two-dimensional antenna array in a downlink angle-of-arrival positioning technology.

The antenna shown in FIG. 2 is a one-dimensional array. When the antenna is actually a two-dimensional array, generally, it is assumed that the two-dimensional antenna array is located on a plane determined by a geographically due north direction and a zenith direction. As shown in FIG. 4, an antenna array element spacing in a horizontal dimension is $d_1\lambda$, and an antenna array element spacing in a vertical dimension is $d_2\lambda$. It is easy to obtain the following relationships among a horizontal/vertical array element, the zenith angle of arrival and the azimuth angle of arrival determined based on FIG. 3, and $d_1$ and $d_2$ in FIG. 4:

$$e^{j2\pi k_1} = e^{j2\pi d_1 \sin \theta \cos \phi}$$

$$e^{j2\pi k_2} = e^{j2\pi d_2 \cos \theta}$$

$k_1$ and $k_2$ are obtained through measurement, and then values of θ and φ can be obtained through inverse solution. When the base station has another orientation, rotation between the base station orientation and the orientation shown in FIG. 4 further needs to be considered to obtain values of θ and φ.

In an existing angle-based positioning solution, the base station estimates an angle of the terminal, and a plurality of base stations jointly determine a terminal position based on absolute coordinates of the base station.

Angle positioning has an error, and the error increases as a distance between the terminal device and the base station increases. Consequently, there is a large error in a scenario of requiring high position accuracy such as an internet of vehicles scenario, and a relative position relationship between two vehicles cannot be accurately determined.

In view of this, this application provides a method to optimize a positioning method of a terminal device, so that the terminal device can be more accurately positioned.

The following describes in detail embodiments provided in this application with reference to the accompanying drawings.

By way of example but not limitation, the network device in all embodiments of this application may be a RAN, for example, a next-generation radio access network (next-generation radio access network, NG-RAN).

Figure 5:
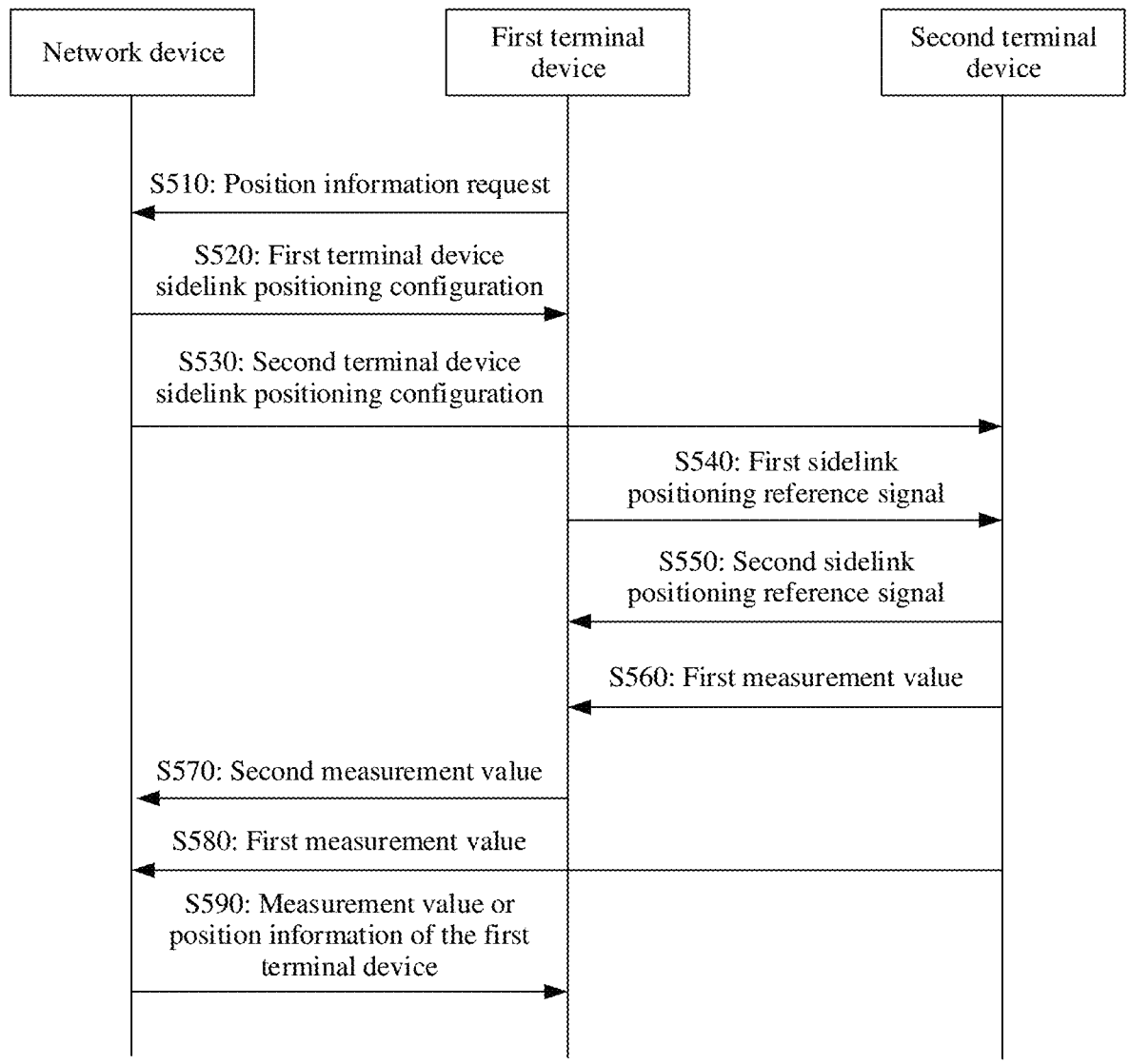
FIG. 5 is a schematic interaction diagram of a sidelink positioning method according to an embodiment of this application.

FIG. 5 is a schematic interaction diagram of a sidelink positioning method according to an embodiment of this application.

S510: A first terminal device sends a position information request to a network device.

Correspondingly, the network device receives the position information request sent by the first terminal device.

Optionally, the position information request further includes a zone (zone) ID, and the zone ID is used to indicate approximate GPS coordinates of the first terminal device or an approximate zone of the first terminal device in a current cell.

The network device may forward the position request to a core network, the core network authorizes the position request, and the network device hosts (host) a positioning process of the first terminal device.

Optionally, the network device may autonomously determine to host (host) the positioning process of the first terminal device through no core network after pre-authorization of the core network.

S520: The network device sends a first sidelink positioning configuration to the first terminal device.

After receiving the position information request of the first terminal device, the network device configures the first sidelink positioning configuration, and sends the first sidelink positioning configuration to the first terminal device.

Optionally, the first sidelink positioning configuration may alternatively be configured by the core network.

The first sidelink positioning configuration information includes one or more of the following configurations:

(1) First sidelink positioning reference signal configuration

A first sidelink positioning reference signal is a reference signal sent by the first terminal device to a second terminal device. The first sidelink positioning reference signal configuration includes:

a time-frequency resource occupied by the first sidelink positioning reference signal, for example, a time domain resource including a periodicity, a slot offset, and an intra-slot symbol index, and a frequency domain resource including an occupied resource block (resource block, RB) and an index of a resource element (Resource Element, RE) in the RB; and sequence information of the first sidelink positioning reference signal.

Optionally, the first sidelink positioning reference signal configuration may further include a quantity of ports, spatial beam information, and power information.

(2) Second sidelink positioning reference signal configuration

A second sidelink positioning reference signal is a reference signal sent by the second terminal device to the first terminal device. The second sidelink positioning reference signal configuration includes:

a time-frequency resource occupied by the second sidelink positioning reference signal, for example, a time domain resource including a periodicity, a slot offset, and an intra-slot symbol index, and a frequency domain resource including an occupied RB and an index of an RE in the RB; and sequence information of the second sidelink positioning reference signal.

Optionally, the second sidelink positioning reference signal configuration may further include a quantity of ports, spatial beam information, and power information.

(3) Measurement reporting configuration of the first terminal device on the second sidelink positioning reference signal, where the measurement reporting configuration includes:

① a measurement value, including a Rx–Tx time difference of the first terminal device and/or a measurement value of the first terminal device on a sidelink (sidelink, SL) AoA of the second sidelink positioning reference signal; and ② a Uu interface measurement value reporting method, where the first terminal device is connected to the network device through a Uu interface, and the terminal device may send information to the network device through the Uu interface; a specific form of the measurement value reporting method is not limited in this embodiment of this application; for example, the measurement value is sent to the network device by using radio resource control (radio resource control, RRC)/a MAC control element (control element, CE) (MAC CE)/uplink control information (uplink control information, UCI), the RRC/the MAC CE can be reported only through a physical uplink shared channel (physical uplink shared channel, PUSCH), and the UCI can be reported through a physical uplink control channel (physical uplink control channel, PUCCH) or a PUSCH.

(4) Information about the second terminal device, including at least one of the following information:

position information of the second terminal device, orientation information of the second terminal device, and speed information of the second terminal device.

S530: The network device sends second sidelink positioning configuration information to the second terminal device.

After receiving the position information request of the first terminal device, the network device configures the second sidelink positioning configuration, and sends the second sidelink positioning configuration to the second terminal device.

Optionally, the second sidelink positioning configuration may alternatively be configured by the core network.

The second sidelink positioning configuration information includes one or more of the following configurations:

(1) First sidelink positioning reference signal configuration

The first sidelink positioning reference signal is the reference signal sent by the first terminal device to the second terminal device. The first sidelink positioning reference signal configuration includes:

the time-frequency resource occupied by the first sidelink positioning reference signal, for example, the time domain resource including the periodicity, the slot offset, and the intra-slot symbol index, and the frequency domain resource including the occupied RB and the index of the RE in the RB; and the sequence information of the first sidelink positioning reference signal.

Optionally, the first sidelink positioning reference signal configuration may further include the quantity of ports, the spatial beam information, and the power information.

(2) Second sidelink positioning reference signal configuration

The second sidelink positioning reference signal is the reference signal sent by the second terminal device to the first terminal device. The second sidelink positioning reference signal configuration includes:

the time-frequency resource occupied by the second sidelink positioning reference signal, for example, the time domain resource including the periodicity, the slot offset, and the intra-slot symbol index, and the frequency domain resource including the occupied RB and the index of the RE in the RB; and the sequence information of the second sidelink positioning reference signal.

Optionally, the second sidelink positioning reference signal configuration may further include the quantity of ports, the spatial beam information, and the power information.

(3) Measurement reporting configuration of the second terminal device on the first sidelink positioning reference signal, where the measurement reporting configuration includes:

① a measurement value, including a Rx-Tx time difference of the second terminal device or a measurement value of the second terminal device on an SL AoA of the first sidelink positioning reference signal;

② a Uu interface measurement value reporting method, where the second terminal device is connected to the network device through a Uu interface, and the terminal device may send information to the network device through the Uu interface; a specific form of the measurement value reporting method is not limited in this embodiment of this application; for example, the measurement value is sent to the network device by using RRC/a MAC CE/UCI, the RRC/the MAC CE can be reported only through a PUSCH, and the UCI can be reported through a PUCCH or a PUSCH; and ③ a PC5 interface measurement reporting method, where the first terminal device is connected to the second terminal device through a PC5 interface, and the first terminal device and the second terminal device may send information to each other through the PC5 interface; a specific form of the measurement value reporting method is not limited in this embodiment of this application; for example, the second terminal device may send information to the first terminal device by using PC5 RRC/a PC5 MAC CE/sidelink control information (sidelink control information, SCI), the PC5 RRC/the PC5 MAC CE can be reported only through a physical sidelink shared channel (physical sidelink shared channel, PSSCH), and the SCI can be reported through a physical sidelink control channel (physical sidelink control channel, PSCCH) or a PSSCH.

S540: The first terminal device sends the first sidelink positioning reference signal to the second terminal device.

The first terminal device sends the first sidelink positioning reference signal to the second terminal device on a corresponding time-frequency resource based on the first sidelink positioning reference signal configuration in the first sidelink positioning configuration.

Correspondingly, the second terminal device receives, on the corresponding time-frequency resource based on the first sidelink positioning reference signal configuration in the second sidelink positioning configuration, the first sidelink positioning reference signal sent by the first terminal device.

S550: The second terminal device sends the second sidelink positioning reference signal to the first terminal device.

The second terminal device sends the second sidelink positioning reference signal to the first terminal device on a corresponding time-frequency resource based on the second sidelink positioning reference signal configuration in the second sidelink positioning configuration.

Correspondingly, the first terminal device receives, on the corresponding time-frequency resource based on the second sidelink positioning reference signal configuration in the first sidelink positioning configuration, the second sidelink positioning reference signal sent by the second terminal device.

The second terminal device determines the Rx-Tx time difference of the second terminal device based on time for receiving the first sidelink positioning reference signal and time for sending the second sidelink positioning reference signal. In addition, the second terminal device may further measure the angle of arrival AoA of the reference signal based on the first sidelink positioning reference signal sent by the first terminal device.

A first measurement value includes the Rx-Tx time difference of the second terminal device and/or the SL AoA, of the first sidelink positioning reference signal, measured by the second terminal device.

Similarly, the first terminal device determines the Rx-Tx time difference of the first terminal device based on time for receiving the second sidelink positioning reference signal and time for sending the first sidelink positioning reference signal. In addition, the first terminal device may further measure the angle of arrival AoA of the reference signal based on the second sidelink positioning reference signal sent by the second terminal device.

A second measurement value includes the Rx-Tx time difference of the first terminal device and/or the SL AoA, of the second sidelink positioning reference signal, measured by the first terminal device.

S560: The second terminal device sends the first measurement value to the first terminal device.

In S530, the network device configures the PC5 interface for the second terminal device, and the second terminal device sends the first measurement value to the first terminal device through the PC5 interface.

Optionally, the first measurement value may further include at least one of the following information: the position information of the second terminal device, the orientation information of the second terminal device, the speed information of the second terminal device, and measurement time information of the second terminal device.

S570: The first terminal device sends the second measurement value to the network device.

In S520, the network device configures the Uu interface for the first terminal device, and the first terminal device sends the second measurement value to the network device through the Uu interface.

Optionally, the second measurement value may further include at least one of the following information: orientation information of the first terminal device, speed information of the first terminal device, and measurement time information of the first terminal device.

S580: The second terminal device sends the first measurement value to the network device.

In S530, the network device configures the Uu interface for the second terminal device, and the second terminal device sends the first measurement value to the network device through the Uu interface.

Optionally, the first measurement value may further include at least one of the following information: the position information of the second terminal device, the orientation information of the second terminal device, the speed information of the second terminal device, and the measurement time information of the second terminal device.

S590: The network device sends a measurement value or position information of the first terminal device to the first terminal device.

In S520, the network device configures the Uu interface for the first terminal device. The network device sends the measurement value to the first terminal device through the Uu interface, where the measurement value includes the first measurement value and/or the second measurement value. The first terminal device calculates a position of the first terminal device based on the received measurement value and the position information of the second terminal device.

Optionally, the network device may calculate the position information of the first terminal device based on the first measurement value and/or the second measurement value and the position information of the second terminal device, and then send the position information to the first terminal device through the Uu interface.

In the foregoing technical solution, a relative position relationship of a terminal is measured based on a sidelink reference signal. The first terminal device and the second terminal device mutually measure reference signals, and the position information of the first terminal device is determined based on the first measurement value and/or the second measurement value. When a measurement object is selected, a distance between the terminal devices is far less than a distance between the terminal device and the network device, so that positioning accuracy is improved. In addition, the positioning process is hosted by the network device and is not controlled by the core network, so that a positioning latency of the first terminal device is relatively reduced.

Figure 6:
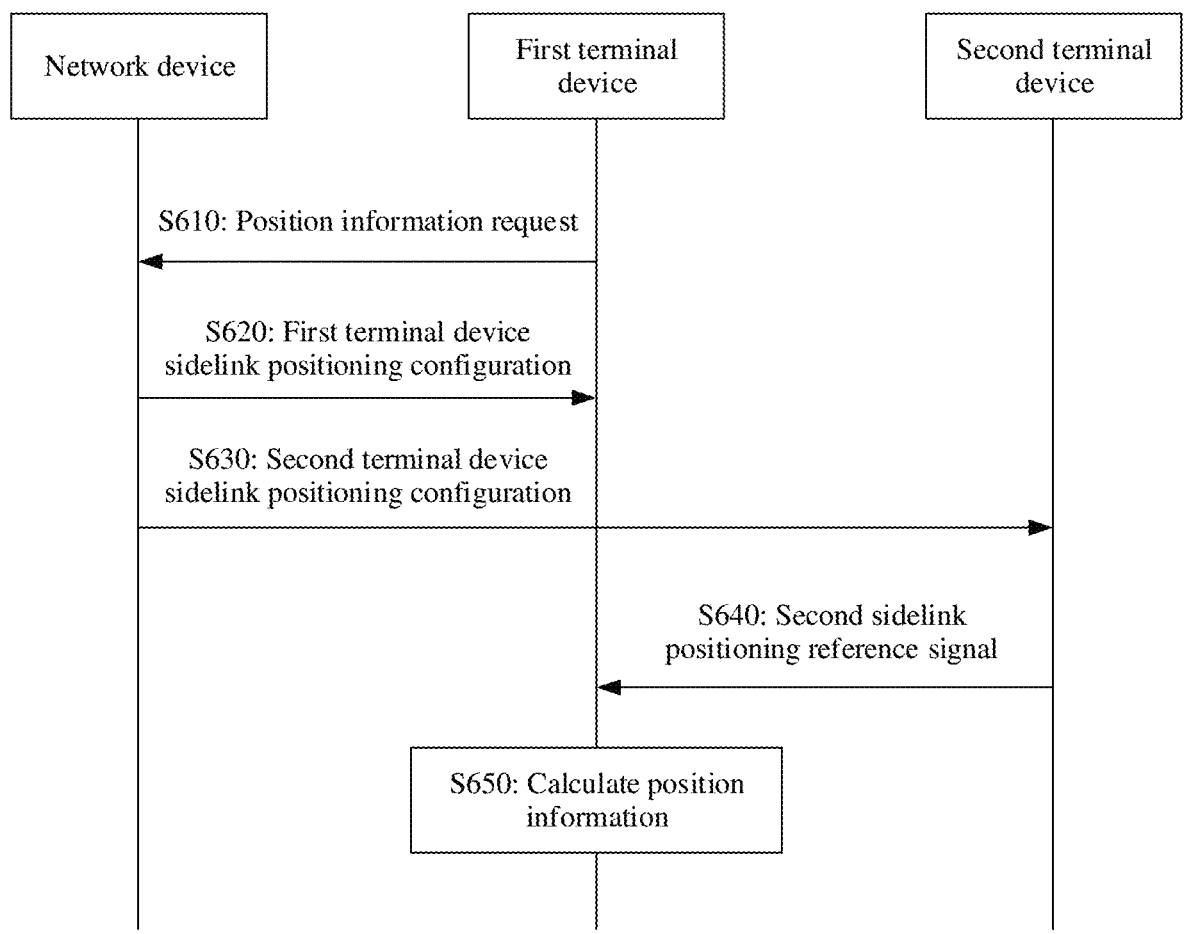
FIG. 6 is a schematic interaction diagram of another sidelink positioning method according to an embodiment of this application.

FIG. 6 is a schematic interaction diagram of another sidelink positioning method according to an embodiment of this application.

S610 is similar to S510. For specific descriptions, refer to S510. For brevity, details are not described herein again.

S620: The network device sends first sidelink positioning configuration information to the first terminal device.

After receiving the position information request of the first terminal device, the network device configures the first sidelink positioning configuration, and sends the first sidelink positioning configuration to the first terminal device.

Optionally, the first sidelink positioning configuration may alternatively be configured by a core network.

The first sidelink positioning configuration information includes:

(1) Second sidelink positioning reference signal configuration

A second sidelink positioning reference signal is a reference signal sent by a second terminal device to the first terminal device. The second sidelink positioning reference signal configuration includes:

a time-frequency resource occupied by the second sidelink positioning reference signal, for example, a time domain resource including a periodicity, a slot offset, and an intra-slot symbol index, and a frequency domain resource including an occupied RB and an index of an RE in the RB; and sequence information of the second sidelink positioning reference signal.

Optionally, the second sidelink positioning reference signal configuration may further include a quantity of ports, spatial beam information, and power information.

(2) Information about the second terminal device, including at least one of the following information:

position information of the second terminal device, orientation information of the second terminal device, and speed information of the second terminal device.

S630: The network device sends second sidelink positioning configuration information to the second terminal device.

After receiving the position information request of the first terminal device, the network device configures the second sidelink positioning configuration, and sends the second sidelink positioning configuration to the second terminal device.

Optionally, the second sidelink positioning configuration may alternatively be configured by the core network.

The second sidelink positioning configuration information includes:

(1) Second sidelink positioning reference signal configuration

The second sidelink positioning reference signal is the reference signal sent by the second terminal device to the first terminal device. The second sidelink positioning reference signal configuration includes:

the time-frequency resource occupied by the second sidelink positioning reference signal, for example, the time domain resource including the periodicity, the slot offset, and the intra-slot symbol index, and the frequency domain resource including the occupied RB and the index of the RE in the RB; and the sequence information of the second sidelink positioning reference signal.

Optionally, the second sidelink positioning reference signal configuration may further include the quantity of ports, the spatial beam information, and the power information.

S640: The second terminal device sends the second sidelink positioning reference signal to the first terminal device.

The second terminal device sends the second sidelink positioning reference signal to the first terminal device on a corresponding time-frequency resource based on the second sidelink positioning reference signal configuration in the second sidelink positioning configuration.

Correspondingly, the first terminal device receives, on the corresponding time-frequency resource based on the second sidelink positioning reference signal configuration in the first sidelink positioning configuration, the second sidelink positioning reference signal sent by the second terminal device, and measures an AoA of the second sidelink positioning reference signal sent by the second terminal device. A second measurement value includes the SL AoA.

S650: The first terminal device calculates position information.

The first terminal device calculates the position information of the first terminal device based on the position information of the second terminal device and the second measurement value obtained through measurement.

In the foregoing technical solution, a relative position relationship of a terminal is measured based on a sidelink reference signal. The first terminal device measures the AoA of the second sidelink positioning reference signal sent by the second terminal device, and the first terminal device calculates the position information of the first terminal device. The terminal device is used as a measurement reference object, so that positioning accuracy is improved. In addition, a positioning process is not controlled by the core network, so that a positioning latency is reduced.

Figure 7:
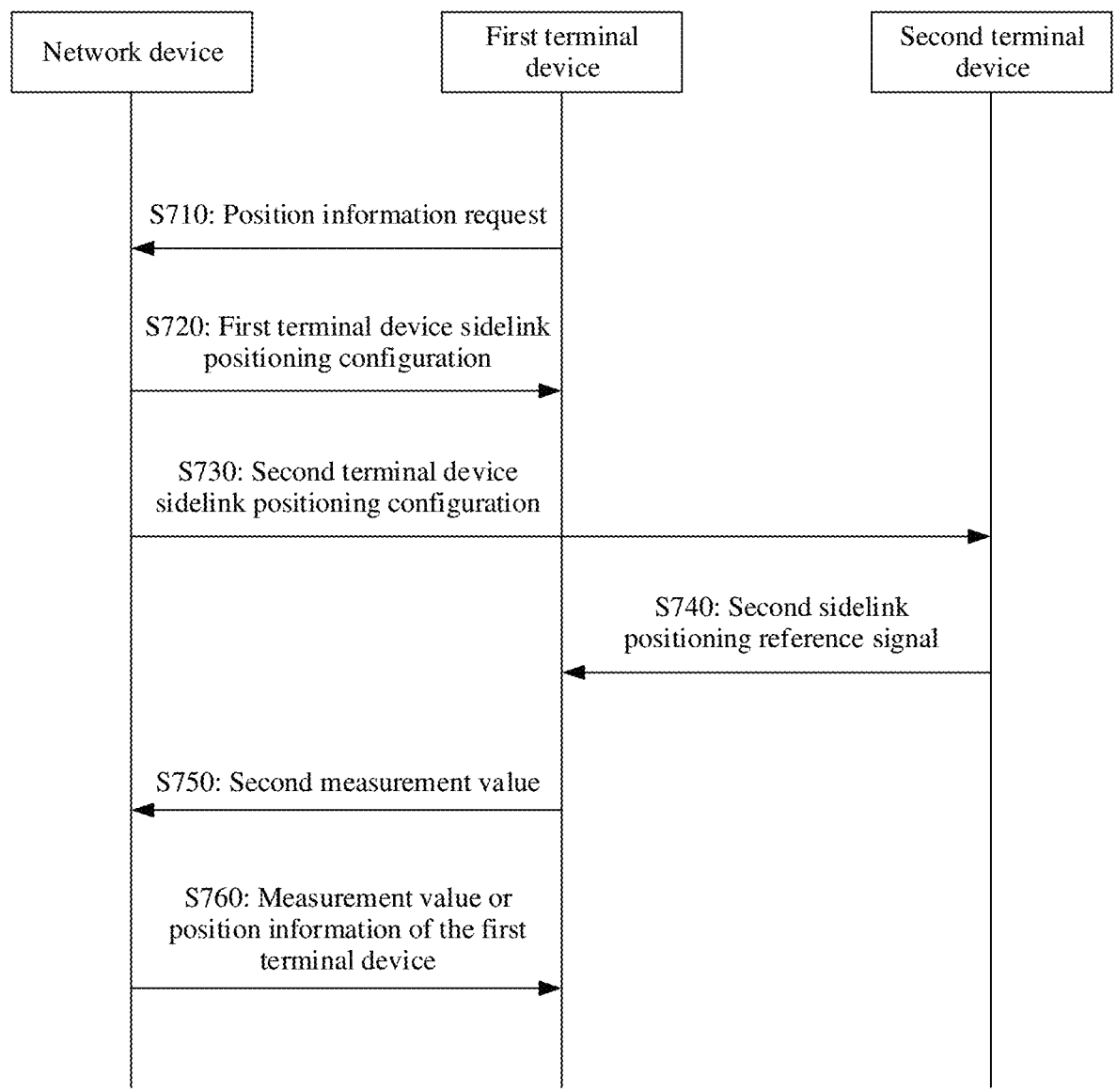
FIG. 7 is a schematic interaction diagram of still another sidelink positioning method according to an embodiment of this application.

FIG. 7 is a schematic interaction diagram of still another sidelink positioning method according to an embodiment of this application.

S710 is similar to S510. For specific descriptions, refer to S510. For brevity, details are not described herein again.

S720: The network device sends first sidelink positioning configuration information to the first terminal device.

After receiving the position information request of the first terminal device, the network device configures the first sidelink positioning configuration, and sends the first sidelink positioning configuration to the first terminal device.

Optionally, the first sidelink positioning configuration may alternatively be configured by a core network.

The first sidelink positioning configuration information includes:

(1) First sidelink positioning reference signal configuration

A first sidelink positioning reference signal is a reference signal sent by the first terminal device to a second terminal device. The first sidelink positioning reference signal configuration includes:

a time-frequency resource occupied by the first sidelink positioning reference signal, for example, a time domain resource including a periodicity, a slot offset, and an intra-slot symbol index, and a frequency domain resource including an occupied resource block (resource block, RB) and an index of a resource element (Resource Element, RE) in the RB; and sequence information of the first sidelink positioning reference signal.

Optionally, the first sidelink positioning reference signal configuration may further include a quantity of ports, spatial beam information, and power information.

(2) Measurement reporting configuration of the first terminal device on a second sidelink positioning reference signal, where the measurement reporting configuration includes:

① a measurement value, including a measurement value of the first terminal device on an SL AoA of the second sidelink positioning reference signal; and ② a Uu interface measurement value reporting method, where the first terminal device is connected to the network device through a Uu interface, and the terminal device may send information to the network device through the Uu interface; a specific form of the measurement value reporting method is not limited in this embodiment of this application; for example, the measurement value is sent to the network device by using RRC/a MAC CE/UCI, the RRC/the MAC CE can be reported through only a PUSCH, and the UCI can be reported through a PUCCH or a PUSCH.

S730: The network device sends second sidelink positioning configuration information to the second terminal device.

After receiving the position information request of the first terminal device, the network device configures the second sidelink positioning configuration, and sends the second sidelink positioning configuration to the second terminal device.

Optionally, the second sidelink positioning configuration may alternatively be configured by the core network.

The second sidelink positioning configuration information includes:

(1) Second sidelink positioning reference signal configuration

The second sidelink positioning reference signal is a reference signal sent by the second terminal device to the first terminal device. The second sidelink positioning reference signal configuration includes:

a time-frequency resource occupied by the second sidelink positioning reference signal, for example, a time domain resource including a periodicity, a slot offset, and an intra-slot symbol index, and a frequency domain resource including an occupied RB and an index of an RE in the RB; and sequence information of the second sidelink positioning reference signal.

Optionally, the second sidelink positioning reference signal configuration may further include a quantity of ports, spatial beam information, and power information.

S740: The second terminal device sends the second sidelink positioning reference signal to the first terminal device.

The second terminal device sends the second sidelink positioning reference signal to the first terminal device on a corresponding time-frequency resource based on the second sidelink positioning reference signal configuration in the second sidelink positioning configuration sent by the network device.

Correspondingly, the first terminal device receives, on the corresponding time-frequency resource based on the second sidelink positioning reference signal configuration in the first sidelink positioning configuration, the second sidelink positioning reference signal sent by the second terminal device, and measures the AoA of the second sidelink positioning reference signal sent by the second terminal device. A second measurement value includes the SL AoA.

S750: The first terminal device sends the second measurement value to the network device.

In S720, the network device configures the Uu interface for the first terminal device, and the first terminal device sends the second measurement value to the network device through the Uu interface.

Optionally, the second measurement value may further include at least one of the following information: orientation information of the first terminal device, speed information of the first terminal device, and measurement time information of the first terminal device.

S760: The network device sends a measurement value or position information of the first terminal device to the first terminal device.

In S720, the network device configures the Uu interface for the first terminal device. The network device sends the measurement value to the first terminal device through the Uu interface, where the measurement value includes the second measurement value. The first terminal device calculates a position of the first terminal device based on the measurement value sent by the network device and position information of the second terminal device.

Optionally, the network device may calculate the position information of the first terminal device based on the second measurement value reported by the first terminal device and the position information of the second terminal device, and then send the position information to the first terminal device through the Uu interface.

In the foregoing technical solution, a relative position relationship of a terminal is measured based on a sidelink reference signal. The first terminal device measures the AoA of the second sidelink positioning reference signal sent by the second terminal device, and the network device assists in determining the position information of the first terminal device. The terminal device is used as a measurement reference object, so that positioning accuracy is improved. In addition, a positioning process is not controlled by the core network, so that a positioning latency is reduced.

Figure 8:
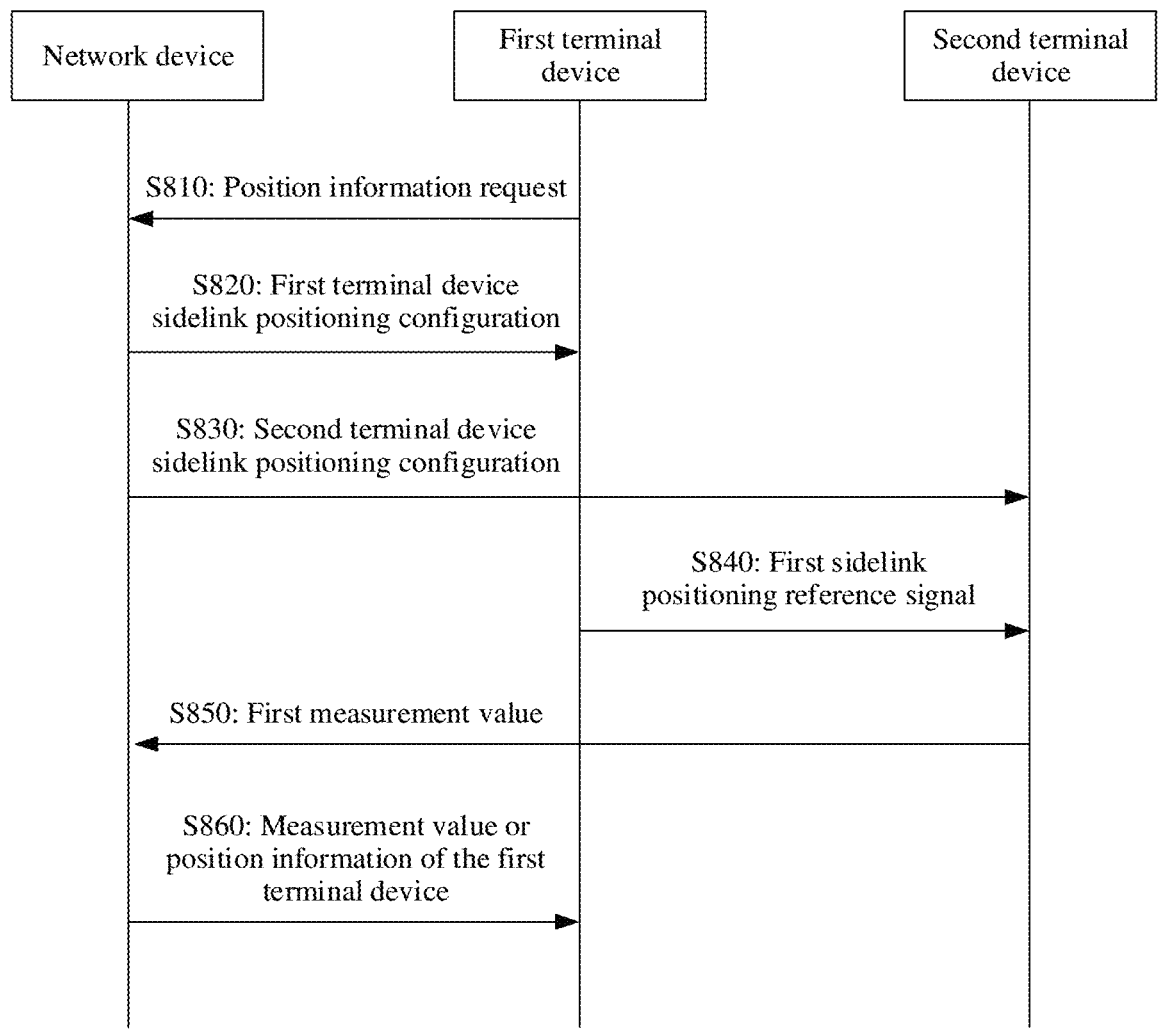
FIG. 8 is a schematic interaction diagram of yet another sidelink positioning method according to an embodiment of this application.

FIG. 8 is a schematic interaction diagram of yet another sidelink positioning method according to an embodiment of this application.

S810 is similar to S510. For specific descriptions, refer to S510. For brevity, details are not described herein again.

S820: The network device sends first sidelink positioning configuration information to the first terminal device.

After receiving the position information request of the first terminal device, the network device configures the first sidelink positioning configuration, and sends the first sidelink positioning configuration to the first terminal device.

Optionally, the first sidelink positioning configuration may alternatively be configured by a core network.

The first sidelink positioning configuration information includes:

(1) First sidelink positioning reference signal configuration

A first sidelink positioning reference signal is a reference signal sent by the first terminal device to a second terminal device. The first sidelink positioning reference signal configuration includes:

a time-frequency resource occupied by the first sidelink positioning reference signal, for example, a time domain resource including a periodicity, a slot offset, and an intra-slot symbol index, and a frequency domain resource including an occupied RB and an index of an RE in the RB; and sequence information of the first sidelink positioning reference signal.

Optionally, the first sidelink positioning reference signal configuration may further include a quantity of ports, spatial beam information, and power information.

S830: The network device sends second sidelink positioning configuration information to the second terminal device.

After receiving the position information request of the first terminal device, the network device configures the second sidelink positioning configuration, and sends the second sidelink positioning configuration to the second terminal device.

Optionally, the second sidelink positioning configuration may alternatively be configured by the core network.

The second sidelink positioning configuration information includes:

(1) First sidelink positioning reference signal configuration

The first sidelink positioning reference signal is the reference signal sent by the first terminal device to the second terminal device. The first sidelink positioning reference signal configuration includes:

the time-frequency resource occupied by the first sidelink positioning reference signal, for example, the time domain resource including the periodicity, the slot offset, and the intra-slot symbol index, and the frequency domain resource including the occupied RB and the index of the RE in the RB; and the sequence information of the first sidelink positioning reference signal.

Optionally, the first sidelink positioning reference signal configuration may further include the quantity of ports, the spatial beam information, and the power information.

(2) Measurement reporting configuration of the second terminal device on the first sidelink positioning reference signal, where the measurement reporting configuration includes:

① a measurement value, including a measurement value of the second terminal device on an AoA of the first sidelink positioning reference signal; and ② a Uu interface measurement value reporting method, where the second terminal device is connected to the network device through a Uu interface, and the terminal device may send information to the network device through the Uu interface; a specific form of the measurement value reporting method is not limited in this embodiment of this application; for example, the measurement value is sent to the network device by using RRC/a MAC CE/UCI, the RRC/the MAC CE can be reported only through a PUSCH, and the UCI can be reported through a PUCCH or a PUSCH.

S840: The first terminal device sends the first sidelink positioning reference signal to the second terminal device.

The first terminal device sends the first sidelink positioning reference signal to the second terminal device on a corresponding time-frequency resource based on the first sidelink positioning reference signal configuration in the first sidelink positioning configuration.

Correspondingly, the second terminal device receives, on the corresponding time-frequency resource based on the first sidelink positioning reference signal configuration in the second sidelink positioning configuration, the first sidelink positioning reference signal sent by the first terminal device, and measures the AoA of the first sidelink positioning reference signal. A first measurement value includes the SL AoA.

S850: The second terminal device sends the first measurement value to the network device.

In S830, the network device configures the Uu interface for the second terminal device, and the second terminal device sends the first measurement value to the network device through the Uu interface.

Optionally, the first measurement value may further include at least one of the following information: position information of the second terminal device, orientation information of the second terminal device, speed information of the second terminal device, and measurement time information of the second terminal device.

S860: The network device sends a measurement value or position information of the first terminal device to the first terminal device.

In S830, the network device configures the Uu interface for the second terminal device. The network device sends the measurement value to the first terminal device through the Uu interface, where the measurement value includes the first measurement value. The first terminal device calculates a position of the first terminal device based on the measurement value sent by the network device and the position information of the second terminal device.

Optionally, the network device may calculate the position information of the first terminal device based on the first measurement value reported by the second terminal device and the position information of the second terminal device, and then send the position information to the first terminal device through the Uu interface.

In the foregoing technical solution, a relative position relationship of a terminal is measured based on a sidelink reference signal, and the technical solution is applicable to a terminal device that does not support sidelink reference signal measurement. For example, when the first terminal device does not support sidelink reference signal measurement, the second terminal device assists the first terminal device in measuring the SL AoA, and the second terminal device performs specific measurement. In this way, even if the to-be-positioned terminal device does not support sidelink reference signal measurement, another terminal device may perform measurement instead of the to-be-positioned terminal device.

Figure 9:
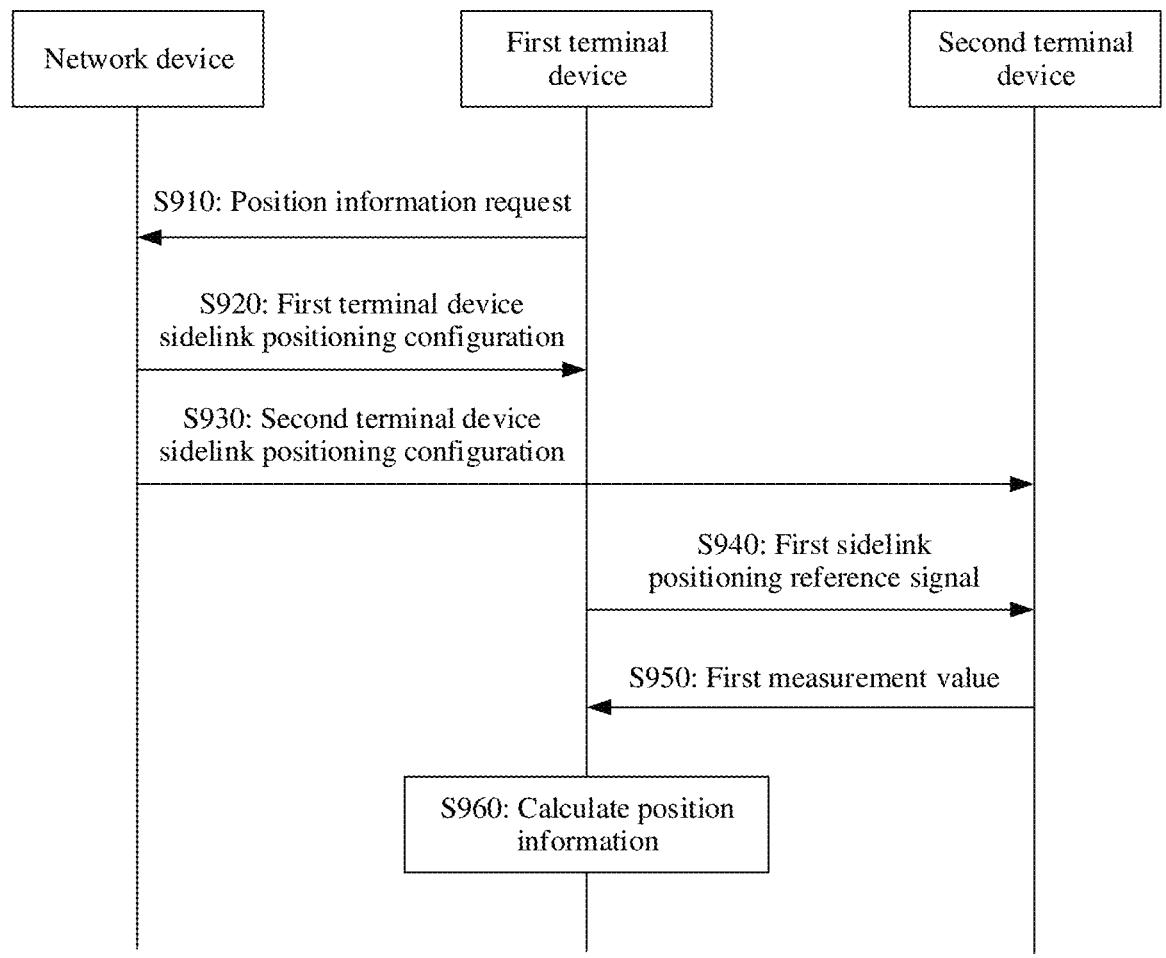
FIG. 9 is a schematic interaction diagram of still yet another sidelink positioning method according to an embodiment of this application.

FIG. 9 is a schematic interaction diagram of still yet another sidelink positioning method according to an embodiment of this application.

S910 is similar to S510. For specific descriptions, refer to S510. For brevity, details are not described herein again.

S920: The network device sends first sidelink positioning configuration information to the first terminal device.

After receiving the position information request of the first terminal device, the network device configures the first sidelink positioning configuration, and sends the first sidelink positioning configuration to the first terminal device.

Optionally, the first sidelink positioning configuration may alternatively be configured by a core network.

The first sidelink positioning configuration information includes:

(1) First sidelink positioning reference signal configuration

A first sidelink positioning reference signal is a reference signal sent by the first terminal device to a second terminal device. The first sidelink positioning reference signal configuration includes:

a time-frequency resource occupied by the first sidelink positioning reference signal, for example, a time domain resource including a periodicity, a slot offset, and an intra-slot symbol index, and a frequency domain resource including an occupied RB and an index of an RE in the RB; and sequence information of the first sidelink positioning reference signal.

Optionally, the first sidelink positioning reference signal configuration may further include a quantity of ports, spatial beam information, and power information.

(2) Information about the second terminal device, including at least one of the following information:

position information of the second terminal device, orientation information of the second terminal device, and speed information of the second terminal device.

S930: The network device sends second sidelink positioning configuration information to the second terminal device.

After receiving the position information request of the first terminal device, the network device configures the second sidelink positioning configuration, and sends the second sidelink positioning configuration to the second terminal device.

Optionally, the second sidelink positioning configuration may alternatively be configured by the core network.

The second sidelink positioning configuration information includes:

(1) First sidelink positioning reference signal configuration

The first sidelink positioning reference signal is the reference signal sent by the first terminal device to the second terminal device. The first sidelink positioning reference signal configuration includes:

the time-frequency resource occupied by the first sidelink positioning reference signal, for example, the time domain resource including the periodicity, the slot offset, and the intra-slot symbol index, and the frequency domain resource including the occupied RB and the index of the RE in the RB; and the sequence information of the first sidelink positioning reference signal.

Optionally, the first sidelink positioning reference signal configuration may further include the quantity of ports, the spatial beam information, and the power information.

(2) Measurement reporting configuration of the second terminal device on the first sidelink positioning reference signal, where the measurement reporting configuration includes:

① a measurement value, including a measurement value of the second terminal device on an AoA of the first sidelink positioning reference signal; and ② a PC5 interface measurement reporting method, where the first terminal device is connected to the second terminal device through a PC5 interface, and the first terminal device and the second terminal device may send information to each other through the PC5 interface; a specific form of the measurement value reporting method is not limited in this embodiment of this application; for example, the second terminal device may send information to the first terminal device by using PC5 RRC/a PC5 MAC CE/SCI, the PC5 RRC/ the PC5 MAC CE can be reported only through a PSSCH, and the SCI can be reported through a PSCCH or a PSSCH.

S940: The first terminal device sends the first sidelink positioning reference signal to the second terminal device.

The first terminal device sends the first sidelink positioning reference signal to the second terminal device on a corresponding time-frequency resource based on the first sidelink positioning reference signal configuration in the first sidelink positioning configuration sent by the network device.

Correspondingly, the second terminal device receives, on the corresponding time-frequency resource based on the first sidelink positioning reference signal configuration in the second sidelink positioning configuration, the first sidelink positioning reference signal sent by the first terminal device, and measures the AoA of the first sidelink positioning reference signal. A first measurement value includes the SL AoA.

S950: The second terminal device sends the first measurement value to the first terminal device.

In S930, the network device configures the PC5 interface for the second terminal device, and the second terminal device sends the first measurement value to the first terminal device through the PC5 interface.

Optionally, the first measurement value may further include at least one of the following information: the position information of the second terminal device, the orientation information of the second terminal device, the speed information of the second terminal device, and measurement time information of the second terminal device.

S960: The first terminal device calculates position information.

The first terminal device calculates the position information of the first terminal device based on the first measurement value sent by the second terminal device and the position information of the second terminal device.

In the foregoing technical solution, a relative position relationship of a terminal is measured based on a sidelink reference signal, and the technical solution is applicable to a terminal device that does not support sidelink reference signal measurement. For example, when the first terminal device does not support sidelink reference signal measurement, the second terminal device assists the first terminal device in measuring the SL AoA, and the second terminal device performs specific measurement. In this way, even if the to-be-positioned terminal device does not support sidelink reference signal measurement, another terminal device may perform measurement instead of the to-be-positioned terminal device.

Figure 10:
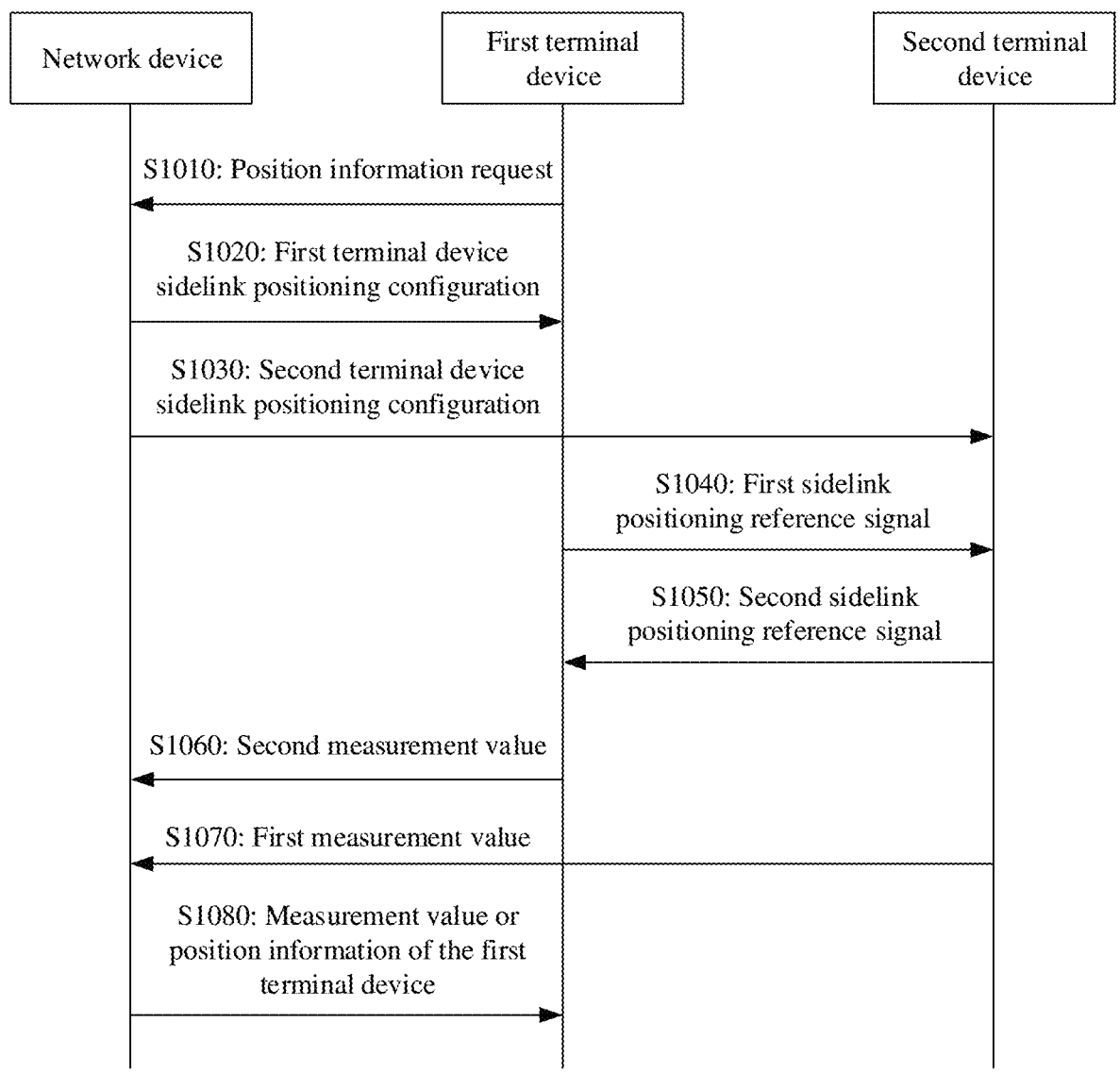
FIG. 10 is a schematic interaction diagram of a further sidelink positioning method according to an embodiment of this application.

FIG. 10 is a schematic interaction diagram of a further sidelink positioning method according to an embodiment of this application.

S1010 is similar to S510. For specific descriptions, refer to S510. For brevity, details are not described herein again.

S1020: The network device sends first sidelink positioning configuration information to the first terminal device.

After receiving the position information request of the first terminal device, the network device configures the first sidelink positioning configuration, and sends the first sidelink positioning configuration to the first terminal device.

Optionally, the first sidelink positioning configuration may alternatively be configured by a core network.

The first sidelink positioning configuration information includes:

(1) First sidelink positioning reference signal configuration

A first sidelink positioning reference signal is a reference signal sent by the first terminal device to a second terminal device. The first sidelink positioning reference signal configuration includes:

a time-frequency resource occupied by the first sidelink positioning reference signal, for example, a time domain resource including a periodicity, a slot offset, and an intra-slot symbol index, and a frequency domain resource including an occupied RB and an index of an RE in the RB; and sequence information of the first sidelink positioning reference signal.

Optionally, the first sidelink positioning reference signal configuration may further include a quantity of ports, spatial beam information, and power information.

(2) Second sidelink positioning reference signal configuration

A second sidelink positioning reference signal is a reference signal sent by the second terminal device to the first terminal device. The second sidelink positioning reference signal configuration includes:

a time-frequency resource occupied by the second sidelink positioning reference signal, for example, a time domain resource including a periodicity, a slot offset, and an intra-slot symbol index, and a frequency domain resource including an occupied RB and an index of an RE in the RB; and sequence information of the second sidelink positioning reference signal.

Optionally, the second sidelink positioning reference signal configuration may further include a quantity of ports, spatial beam information, and power information.

(3) Measurement reporting configuration of the first terminal device on the second sidelink positioning reference signal, where the measurement reporting configuration includes:

① a measurement value, including a Rx–Tx time difference of the first terminal device; and ② a Uu interface measurement value reporting method, where the first terminal device is connected to the network device through a Uu interface, and the terminal device may send information to the network device through the Uu interface; a specific form of the measurement value reporting method is not limited in this embodiment of this application; for example, the measurement value is sent to the network device by using RRC/a MAC CE/UCI, the RRC/the MAC CE can be reported only through a PUSCH, and the UCI can be reported through a PUCCH or a PUSCH.

S1030: The network device sends second sidelink positioning configuration information to the second terminal device.

After receiving the position information request of the first terminal device, the network device configures the second sidelink positioning configuration, and sends the second sidelink positioning configuration to the second terminal device.

Optionally, the second sidelink positioning configuration may alternatively be configured by the core network.

The second sidelink positioning configuration information includes:

(1) First sidelink positioning reference signal configuration

The first sidelink positioning reference signal is the reference signal sent by the first terminal device to the second terminal device. The first sidelink positioning reference signal configuration includes:

the time-frequency resource occupied by the first sidelink positioning reference signal, for example, the time domain resource including the periodicity, the slot offset, and the intra-slot symbol index, and the frequency domain resource including the occupied RB and the index of the RE in the RB; and the sequence information of the first sidelink positioning reference signal.

Optionally, the first sidelink positioning reference signal configuration may further include the quantity of ports, the spatial beam information, and the power information.

(2) Second sidelink positioning reference signal configuration

The second sidelink positioning reference signal is the reference signal sent by the second terminal device to the first terminal device. The second sidelink positioning reference signal configuration includes:

the time-frequency resource occupied by the second sidelink positioning reference signal, for example, the time domain resource including the periodicity, the slot offset, and the intra-slot symbol index, and the frequency domain resource including the occupied RB and the index of the RE in the RB; and the sequence information of the second sidelink positioning reference signal.

Optionally, the second sidelink positioning reference signal configuration may further include the quantity of ports, the spatial beam information, and the power information.

(3) Measurement reporting configuration of the second terminal device on the sidelink positioning reference signal sent by the first terminal device, where the measurement reporting configuration includes:

① a measurement value, including a Rx–Tx time difference of the second terminal device;

② a Uu interface measurement value reporting method, where the second terminal device is connected to the network device through a Uu interface, and the terminal device may send information to the network device through the Uu interface; a specific form of the measurement value reporting method is not limited in this embodiment of this application; for example, the measurement value is sent to the network device by using RRC/a MAC CE/UCI, the RRC/the MAC CE can be reported only through a PUSCH, and the UCI can be reported through a PUCCH or a PUSCH; and ③ a PC5 interface measurement reporting method, where the first terminal device is connected to the second terminal device through a PC5 interface, and the first terminal device and the second terminal device may send information to each other through the PC5 interface; a specific form of the measurement value reporting method is not limited in this embodiment of this application; for example, the second terminal device may send information to the first terminal device by using PC5 RRC/a PC5 MAC CE/SCI, the PC5 RRC/the PC5 MAC CE can be reported only through a PSSCH, and the SCI can be reported through a PSCCH or a PSSCH.

S1040: The first terminal device sends the first sidelink positioning reference signal to the second terminal device.

The first terminal device sends the first sidelink positioning reference signal to the second terminal device on a corresponding time-frequency resource based on the first sidelink positioning reference signal configuration in the first sidelink positioning configuration sent by the network device.

Correspondingly, the second terminal device receives, on the corresponding time-frequency resource based on the first sidelink positioning reference signal configuration in the second sidelink positioning configuration, the first sidelink positioning reference signal sent by the first terminal device.

In addition, the first terminal device measures that time at which the first terminal device sends the first sidelink positioning reference signal is a, and the second terminal device measures that time at which the second terminal device receives the first sidelink reference signal is b.

S1050: The second terminal device sends the second sidelink positioning reference signal to the first terminal device.

The second terminal device sends the second sidelink positioning reference signal to the first terminal device on a corresponding time-frequency resource based on the second sidelink positioning reference signal configuration in the second sidelink positioning configuration sent by the network device.

Correspondingly, the first terminal device receives, on the corresponding time-frequency resource based on the second sidelink positioning reference signal configuration in the first sidelink positioning configuration, the second sidelink positioning reference signal sent by the second terminal device.

In addition, the second terminal device measures that time at which the second terminal device sends the second sidelink positioning reference signal is c, and the first terminal device measures that time at which the first terminal device receives the second sidelink positioning reference signal is d.

The second terminal device determines the Rx–Tx time difference (where the time difference is equal to b–c) of the second terminal device based on the time for receiving the first sidelink positioning reference signal and the time for sending the second sidelink positioning reference signal. A first measurement value includes the Rx–Tx time difference of the second terminal device.

Similarly, the first terminal device determines the Rx–Tx time difference (where the time difference is equal to d–a) of the first terminal device based on the time for receiving the second sidelink positioning reference signal and the time for sending the first sidelink positioning reference signal. A second measurement value includes the Rx–Tx time difference of the first terminal device.

It should be understood that a, b, c, and d herein may be absolute time, or may include start moments of subframes in which the first sidelink reference signal is sent, the first sidelink reference signal is received, the second sidelink reference signal is sent, and the second sidelink reference signal is received.

It should be understood that the Rx–Tx time difference (b–c, d–a) may alternatively correspond to a time difference at a subframe boundary. For example, the Rx–Tx time difference of the second terminal device may be ((b–c) mod 1) ms or (((b–c+0.5) mod 1)–0.5) ms. For example, when b–c=1.3 ms, the Rx–Tx time difference of the second terminal device is 0.3 ms.

S1060: The first terminal device sends the second measurement value to the network device.

In S1020, the network device configures the Uu interface for the first terminal device, and the first terminal device sends the second measurement value to the network device through the Uu interface.

Optionally, the second measurement value may further include at least one of the following information: orientation information of the first terminal device, speed information of the first terminal device, and measurement time information of the first terminal device.

S1070: The second terminal device sends the first measurement value to the network device.

In S1030, the network device configures the Uu interface for the second terminal device, and the second terminal device sends the first measurement value to the network device through the Uu interface.

Optionally, the first measurement value may further include at least one of the following information: position information of the second terminal device, orientation information of the second terminal device, speed information of the second terminal device, and measurement time information of the second terminal device.

S1080: The network device sends a measurement value or position information of the first terminal device to the first terminal device.

In S1020, the network device configures the Uu interface for the first terminal device, and the network device sends the measurement value to the first terminal device through the Uu interface, where the measurement value includes the first measurement value and the second measurement value. The first terminal device calculates an RTT between the first terminal device and the second terminal device based on the measurement value sent by the network device, and may determine a distance between the first terminal device and the second terminal device based on the RTT, where RTT=(Rx–Tx time difference of the first terminal device+Rx–Tx time difference of the second terminal device)/2. The first terminal device calculates the position information of the first terminal device based on the RTT and the position information of the second terminal device.

Optionally, the network device may alternatively calculate an RTT between the first terminal device and the second terminal device based on the measurement value. The network device calculates a position of the first terminal device based on the RTT and the position information of the second terminal device, and then sends the position information to the first terminal device through the Uu interface.

In the foregoing technical solution, a relative position relationship of a terminal is measured based on a sidelink reference signal. The first terminal device and the second terminal device mutually measure Rx–Tx time differences to determine the SL RTT, and the network device assists the first terminal device in determining the position of the first terminal device.

Figure 11:
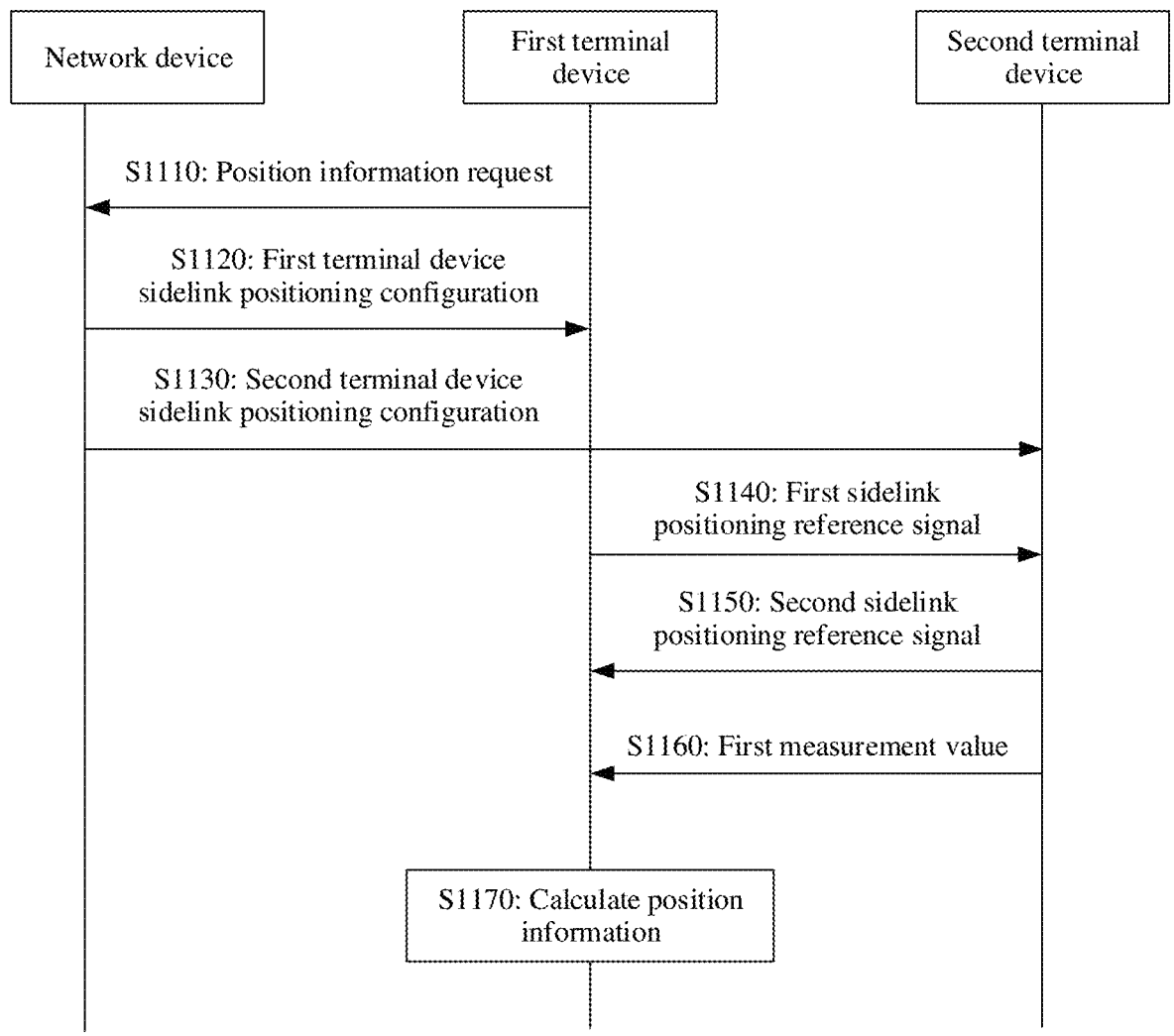
FIG. 11 is a schematic interaction diagram of a still further sidelink positioning method according to an embodiment of this application.

FIG. 11 is a schematic interaction diagram of a still further sidelink positioning method according to an embodiment of this application.

S1110 is similar to S510. For specific descriptions, refer to S510. For brevity, details are not described herein again.

S1120: The network device sends first sidelink positioning configuration information to the first terminal device.

After receiving the position information request of the first terminal device, the network device configures the first sidelink positioning configuration, and sends the first sidelink positioning configuration to the first terminal device.

Optionally, the first sidelink positioning configuration may alternatively be configured by a core network.

The first sidelink positioning configuration information includes:

(1) First sidelink positioning reference signal configuration

A first sidelink positioning reference signal is a reference signal sent by the first terminal device to a second terminal device. The first sidelink positioning reference signal configuration includes:

a time-frequency resource occupied by the first sidelink positioning reference signal, for example, a time domain resource including a periodicity, a slot offset, and an intra-slot symbol index, and a frequency domain resource including an occupied RB and an index of an RE in the RB; and sequence information of the first sidelink positioning reference signal.

Optionally, the first sidelink positioning reference signal configuration may further include a quantity of ports, spatial beam information, and power information.

(2) Second sidelink positioning reference signal configuration

A second sidelink positioning reference signal is a reference signal sent by the second terminal device to the first terminal device. The second sidelink positioning reference signal configuration includes:

a time-frequency resource occupied by the second sidelink positioning reference signal, for example, a time domain resource including a periodicity, a slot offset, and an intra-slot symbol index, and a frequency domain resource including an occupied RB and an index of an RE in the RB; and sequence information of the second sidelink positioning reference signal.

Optionally, the second sidelink positioning reference signal configuration may further include a quantity of ports, spatial beam information, and power information.

(3) Measurement reporting configuration of the first terminal device on the second sidelink positioning reference signal, where the measurement reporting configuration includes:

① a measurement value, including a Rx–Tx time difference of the first terminal device.

(4) Information about the second terminal device, including at least one of the following information:

position information of the second terminal device, orientation information of the second terminal device, and speed information of the second terminal device.

S1130: The network device sends second sidelink positioning configuration information to the second terminal device.

After receiving the position information request of the first terminal device, the network device configures the second sidelink positioning configuration, and sends the second sidelink positioning configuration to the second terminal device.

Optionally, the second sidelink positioning configuration may alternatively be configured by the core network.

The second sidelink positioning configuration information includes:

(1) First sidelink positioning reference signal configuration

The first sidelink positioning reference signal is the reference signal sent by the first terminal device to the second terminal device. The first sidelink positioning reference signal configuration includes:

the time-frequency resource occupied by the first sidelink positioning reference signal, for example, the time domain resource including the periodicity, the slot offset, and the intra-slot symbol index, and the frequency domain resource including the occupied RB and the RE in the RB; and the sequence information of the first sidelink positioning reference signal.

Optionally, the first sidelink positioning reference signal configuration may further include the quantity of ports, the spatial beam information, and the power information.

(2) Second sidelink positioning reference signal configuration

The second sidelink positioning reference signal is the reference signal sent by the second terminal device to the first terminal device. The second sidelink positioning reference signal configuration includes:

the time-frequency resource occupied by the second sidelink positioning reference signal, for example, the time domain resource including the periodicity, the slot offset, and the intra-slot symbol index, and the frequency domain resource including the occupied RB and the index of the RE in the RB; and the sequence information of the second sidelink positioning reference signal.

Optionally, the second sidelink positioning reference signal configuration may further include the quantity of ports, the spatial beam information, and the power information.

(3) Measurement reporting configuration of the second terminal device on the first sidelink positioning reference signal, where the measurement reporting configuration includes:

① a measurement value, including a Rx–Tx time difference of the second terminal device; and ② a PC5 interface measurement reporting method, where the first terminal device is connected to the second terminal device through a PC5 interface, and the first terminal device and the second terminal device may send information to each other through the PC5 interface; a specific form of the measurement value reporting method is not limited in this embodiment of this application; for example, the second terminal device may send information to the first terminal device by using PC5 RRC/a PC5 MAC CE/SCI, the PC5 RRC/the PC5 MAC CE can be reported only through a PSSCH, and the SCI can be reported through a PSCCH or a PSSCH.

S1140: The first terminal device sends the first sidelink positioning reference signal to the second terminal device.

The first terminal device sends the first sidelink positioning reference signal to the second terminal device on a corresponding time-frequency resource based on the first sidelink positioning reference signal configuration in the first sidelink positioning configuration sent by the network device.

Correspondingly, the second terminal device receives, on the corresponding time-frequency resource based on the first sidelink positioning reference signal configuration in the second sidelink positioning configuration, the first sidelink positioning reference signal sent by the first terminal device.

In addition, the first terminal device measures that time at which the first terminal device sends the first sidelink positioning reference signal is a, and the second terminal device measures that time at which the second terminal device receives the first sidelink reference signal is b.

S1150: The second terminal device sends the second sidelink positioning reference signal to the first terminal device.

The second terminal device sends the second sidelink positioning reference signal to the first terminal device on a corresponding time-frequency resource based on the second sidelink positioning reference signal configuration in the second sidelink positioning configuration sent by the network device.

Correspondingly, the first terminal device receives, on the corresponding time-frequency resource based on the second sidelink positioning reference signal configuration in the first sidelink positioning configuration, the second sidelink positioning reference signal sent by the second terminal device.

In addition, the second terminal device measures that time at which the second terminal device sends the second sidelink positioning reference signal is c, and the first terminal device measures that time at which the first terminal device receives the second sidelink positioning reference signal is d.

The second terminal device determines the Rx-Tx time difference (where the time difference is equal to b-c) of the second terminal device based on the time for receiving the first sidelink positioning reference signal and the time for sending the second sidelink positioning reference signal. A first measurement value includes the Rx-Tx time difference of the second terminal device.

Similarly, the first terminal device determines the Rx-Tx time difference (where the time difference is equal to d-a) of the first terminal device based on the time for receiving the second sidelink positioning reference signal and the time for sending the first sidelink positioning reference signal. A second measurement value includes the Rx-Tx time difference of the first terminal device.

It should be understood that a, b, c, and d herein may be absolute time, or may include start moments of subframes in which the first sidelink reference signal is sent, the first sidelink reference signal is received, the second sidelink reference signal is sent, and the second sidelink reference signal is received.

It should be understood that the Rx-Tx time difference (b-c, d-a) may alternatively correspond to a time difference at a subframe boundary. For example, the Rx-Tx time difference of the second terminal device may be ((b-c) mod 1) ms or (((b-c+0.5) mod 1)-0.5) ms. For example, when b-c=1.3 ms, the Rx-Tx time difference of the second terminal device is 0.3 ms.

S1160: The second terminal device sends the first measurement value to the first terminal device.

In S1130, the network device configures the PC5 interface for the second terminal device, and the second terminal device sends the first measurement value to the first terminal device through the PC5 interface.

Optionally, the first measurement value may further include at least one of the following information: the position information of the second terminal device, the orientation information of the second terminal device, the speed information of the second terminal device, and measurement time information of the second terminal device.

S1170: The first terminal device calculates position information of the first terminal device.

The first terminal device calculates an RTT between the first terminal device and the second terminal device based on the received first measurement value and the second measurement value that is obtained by the first terminal device through measurement, and may determine a distance between the first terminal device and the second terminal device based on the RTT, where RTT=(Rx-Tx time difference of the first terminal device+Rx-Tx time difference of the second terminal device)/2. The first terminal device calculates the position information of the first terminal device based on the RTT and the position information of the second terminal device.

In the foregoing technical solution, a relative position relationship of a terminal is measured based on a sidelink reference signal. The first terminal device and the second terminal device mutually measure Rx-Tx time differences to determine the SL RTT, and the first terminal device determines a position of the first terminal device based on the SL RTT and a position of the second terminal device.

Optionally, the methods in FIG. 10 and FIG. 11 may alternatively be combined with the methods in FIG. 5 to FIG. 9, the SL AoA is measured to assist in RTT positioning, to more accurately determine the position information of the first terminal device.

It should be understood that the sidelink positioning reference signal in all embodiments of this application indicates a type of signal used to determine the position information of the first terminal device, and does not indicate a specific signal. A type of the signal is not specifically limited in this application.

It should be understood that the reported first measurement value and/or the reported second measurement value in the foregoing embodiments may include the position information of the second terminal device, or may not include the position information of the second terminal device. When the position information of the second terminal device is not included, the network device or the first terminal device needs to first obtain the position information of the second terminal device before calculating the position of the first terminal device. A manner of obtaining the position information of the second terminal device is not limited herein.

It should be understood that when there are a plurality of to-be-positioned terminal devices, the network device may configure a PC5 interface measurement reporting method for the plurality of terminal devices. The plurality of to-be-positioned terminal devices may measure a relative position relationship between pairwise to-be-positioned terminal devices according to the method in the foregoing embodiments, and send measurement information to each other through a PC5 interface. For example, UE 1 and UE 2 are to-be-positioned terminal devices, and UE 3 is a terminal device with a known position. The UE 1 and the UE 2 may determine a relative position relationship by using the method in the foregoing embodiments. The UE 1 and the UE 3 determine a position of the UE 1 according to the method in the foregoing embodiments. In this case, position information of the UE 2 may be directly determined based on the relative position relationship between the UE 1 and the UE 2, and a position relationship between the UE 2 and the UE 3 does not need to be measured.

It should be understood that all position information in embodiments is not necessarily coordinates based on longitude and latitude, and may be a self-defined coordinate system. For example, the first terminal device or the second terminal device is used as an origin, a due north direction is used as the x axis, a due west direction is used as the y axis, and a vertical direction is used as the z axis. Alternatively, the first terminal device or the second terminal device is used as an origin, a predetermined direction (for example, a platoon advancing direction) is used as the x axis, another horizontal direction perpendicular to the advancing direction is used as the y axis, and a vertical direction is used as the z axis.

It should be understood that all embodiments of this application may further be combined with another positioning technology, to further improve positioning accuracy.

Embodiments described in this specification may be independent solutions, or may be combined based on internal logic. All these solutions fall within the protection scope of this application.

It may be understood that, the methods and the operations implemented by the terminal device in the foregoing method embodiments may alternatively be implemented by a component (for example, a chip or a circuit) that may be used in the terminal device, and the methods and the operations implemented by the network device in the foregoing method embodiments may alternatively be implemented by a component (for example, a chip or a circuit) that may be used in the network device.

The foregoing describes the method embodiments provided in this application, and the following describes apparatus embodiments provided in this application. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in embodiments of this application from a perspective of interaction between network elements. It may be understood that, to implement the foregoing functions, each network element, such as a transmit end device or a receive end device, includes a corresponding hardware structure and/or software module for performing each function. A person skilled in the art may be aware that, with reference to the examples described in embodiments disclosed in this specification, units and algorithm steps can be implemented by hardware or a combination of computer software and hardware in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the protection scope of this application.

In embodiments of this application, the transmit end device or the receive end device may be divided into functional modules based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in embodiments of this application, division into the modules is an example, and is merely logical function division. During actual implementation, another available division manner may be used. An example in which each functional module is obtained through division based on a corresponding function is used below for description.

Figure 12:
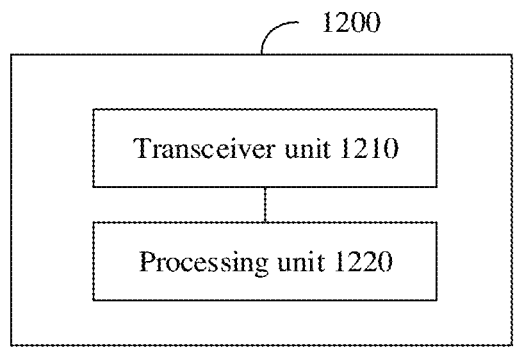
FIG. 12 is a schematic block diagram of a sidelink positioning apparatus according to an embodiment of this application.

FIG. 12 is a schematic block diagram of a sidelink positioning apparatus according to an embodiment of this application. The sidelink positioning apparatus 1200 includes a transceiver unit 1210 and a processing unit 1220. The transceiver unit 1210 may perform external communication, and the processing unit 1220 is configured to process data. The transceiver unit 1210 may also be referred to as a communication interface or a communication unit.

Optionally, the sidelink positioning apparatus 1200 may further include a storage unit. The storage unit may be configured to store instructions and/or data. The processing unit 1220 may read the instructions and/or the data in the storage unit.

The sidelink positioning apparatus 1200 may be configured to perform actions performed by the terminal device in the foregoing method embodiments. In this case, the sidelink positioning apparatus 1200 may be the terminal device or a component that may be disposed in the terminal device. The transceiver unit 1210 is configured to perform transceiver-related operations on a terminal device side in the foregoing method embodiments. The processing unit 1220 is configured to perform processing-related operations on the terminal device side in the foregoing method embodiments.

Alternatively, the sidelink positioning apparatus 1200 may be configured to perform actions performed by the network device in the foregoing method embodiments. In this case, the sidelink positioning apparatus 1200 may be the network device or a component that may be disposed in the network device. The transceiver unit 1210 is configured to perform transceiver-related operations on a network device side in the foregoing method embodiments. The processing unit 1220 is configured to perform processing-related operations on the network device side in the foregoing method embodiments.

In a design, the sidelink positioning apparatus 1200 is configured to perform actions performed by the first terminal device in the embodiments shown in FIG. 5 to FIG. 11. The transceiver unit 1210 is configured to: receive a first sidelink positioning configuration sent by a network device, and send a first sidelink positioning reference signal to a second terminal device based on the first sidelink positioning configuration, where the first sidelink positioning reference signal is used to determine a first measurement value, the first measurement value includes a measurement value of the second terminal device on the first sidelink positioning reference signal, a position of the first terminal device on which the apparatus is disposed is determined based on the first measurement value and a position of the second terminal device, and the first measurement value includes the measurement value of the second terminal device on the first sidelink positioning reference signal.

Optionally, the transceiver unit 1210 is configured to receive the first measurement value from the second terminal device or the network device. The processing unit 1220 is configured to determine the position of the first terminal device based on the first measurement value and the position of the second terminal device.

Optionally, the transceiver unit 1210 is configured to receive, based on the first sidelink positioning configuration, a second sidelink positioning reference signal sent by the second terminal device. The processing unit 1220 is configured to: measure the second sidelink positioning reference signal to obtain a second measurement value, and determine the position of the first terminal device based on the first measurement value, the second measurement value, and the position of the second terminal device.

Optionally, the transceiver unit 1210 is configured to send a position information request to the network device.

Optionally, the first sidelink positioning configuration includes one or more of the following information: a time-frequency resource occupied by the first sidelink positioning reference signal, a time-frequency resource occupied by the second sidelink positioning reference signal, sequence information of the first sidelink positioning reference signal, sequence information of the second sidelink positioning reference signal, information about the second terminal device, and reporting configuration information of the first terminal device, where the reporting configuration information of the first terminal device includes the second measurement value and a Uu interface measurement reporting method.

Optionally, the first measurement value includes a Rx–Tx time difference of the second terminal device and a measurement value of the second terminal device on an angle of arrival of the first sidelink positioning reference signal.

Optionally, the second measurement value includes a Rx–Tx time difference of the transceiver unit and a measurement value of the processing unit on an angle of arrival of the second sidelink positioning reference signal.

Optionally, the transceiver unit 1210 is configured to receive position information of the second terminal device from the network device or the second terminal device.

In another design, the sidelink positioning apparatus 1200 is configured to perform actions performed by the second terminal device in the embodiments shown in FIG. 5 to FIG. 11. The transceiver unit 1210 is configured to: receive a second sidelink positioning configuration sent by a network device, and receive, based on the second sidelink positioning configuration, a first sidelink positioning reference signal sent by a first terminal device. The processing unit 1220 is configured to obtain a first measurement value based on the first sidelink positioning reference signal. The transceiver unit 1210 is configured to: send the first measurement value to the network device, so that the network device determines a position of the first terminal device based on the first measurement value and a position of the second terminal device on which the apparatus is disposed; or send the first measurement value to the first terminal device, so that the first terminal device determines a position of the first terminal device based on the first measurement value and a position of the second terminal device.

Optionally, the transceiver unit 1210 is configured to send a second sidelink positioning reference signal to the first terminal device based on the second sidelink positioning configuration.

Optionally, the second sidelink positioning configuration includes one or more of the following information: a time-frequency resource occupied by the first sidelink positioning reference signal, a time-frequency resource occupied by the second sidelink positioning reference signal, sequence information of the first sidelink positioning reference signal, sequence information of the second sidelink positioning reference signal, information about the second terminal device, and reporting configuration information of the second terminal device, where the reporting configuration information of the second terminal device includes the first measurement value and a PC5 interface measurement reporting method.

Optionally, the first measurement value includes a Rx–Tx time difference of the transceiver unit 1210 and a measurement value of the processing unit 1220 on an angle of arrival of the first sidelink positioning reference signal.

Optionally, the transceiver unit 1210 is configured to send position information of the second terminal device to the network device or the first terminal device.

In still another design, the sidelink positioning apparatus 1200 is configured to perform actions performed by the network device in the embodiments shown in FIG. 5 to FIG. 11. The transceiver unit 1210 is configured to: send a first sidelink positioning configuration to a first terminal device, send a second sidelink positioning configuration to a second terminal device, and receive a first measurement value sent by the second terminal device, where the first measurement value includes a measurement value of the second terminal device on a first sidelink positioning reference signal. The processing unit 1220 is configured to determine a position of the first terminal device based on the first measurement value and a position of the second terminal device.

Optionally, the transceiver unit 1210 is configured to receive a second measurement value sent by the first terminal device, where the second measurement value includes a measurement value of the first terminal device on a second sidelink positioning reference signal sent by the second terminal device. The processing unit 1220 is configured to determine the position of the first terminal device based on the first measurement value, the second measurement value, and the position of the second terminal device.

Optionally, the transceiver unit 1210 is configured to receive a position information request of the first terminal device.

Optionally, the first sidelink positioning configuration information includes one or more of the following configurations: a time-frequency resource occupied by the first sidelink positioning reference signal, a time-frequency resource occupied by the second sidelink positioning reference signal, sequence information of the first sidelink positioning reference signal, sequence information of the second sidelink positioning reference signal, information about the second terminal device, and reporting configuration information of the first terminal device, where the reporting configuration information of the first terminal device includes the second measurement value and a Uu interface measurement reporting method.

Optionally, the second sidelink positioning configuration information includes one or more of the following configurations: the time-frequency resource occupied by the first sidelink positioning reference signal, the time-frequency resource occupied by the second sidelink positioning reference signal, the sequence information of the first sidelink positioning reference signal, the sequence information of the second sidelink positioning reference signal, the information about the second terminal device, and reporting configuration information of the second terminal device, where the reporting configuration information of the second terminal device includes the first measurement value and a PC5 interface measurement reporting method.

Optionally, the first measurement value includes a Rx–Tx time difference of the second terminal device and a measurement value of the second terminal device on an angle of arrival of the first sidelink positioning reference signal.

Optionally, the second measurement value includes a Rx–Tx time difference of the first terminal device and a measurement value of the first terminal device on an angle of arrival of the second sidelink positioning reference signal.

Optionally, the transceiver unit 1210 is configured to receive position information of the second terminal device sent by the second terminal device.

The processing unit 1220 in FIG. 12 may be implemented by a processor or a processor-related circuit. The transceiver unit 1210 may be implemented by a transceiver or a transceiver-related circuit. The transceiver unit 1210 may also be referred to as a communication unit or a communication interface. The storage unit may be implemented by a memory.

Figure 13:
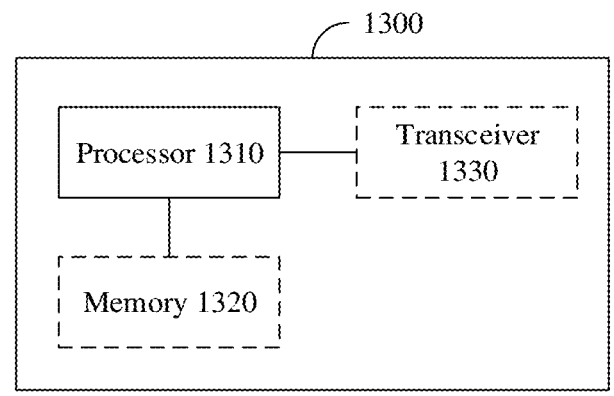
FIG. 13 is a schematic block diagram of another sidelink positioning apparatus according to an embodiment of this application.

As shown in FIG. 13, an embodiment of this application further provides a sidelink positioning apparatus 1300. The sidelink positioning apparatus 1300 includes a processor 1310. The processor 1310 is coupled to a memory 1320, the memory 1320 is configured to store a computer program or instructions and/or data, and the processor 1310 is configured to execute the computer program or the instructions and/or the data stored in the memory 1320, so that the methods in the foregoing method embodiments are performed.

Optionally, the sidelink positioning apparatus 1300 includes one or more processors 1310.

Optionally, as shown in FIG. 13, the sidelink positioning apparatus 1300 may further include the memory 1320.

Optionally, the sidelink positioning apparatus 1300 may include one or more memories 1320.

Optionally, the memory 1320 and the processor 1310 may be integrated together, or disposed separately.

Optionally, as shown in FIG. 13, the sidelink positioning apparatus 1300 may further include a transceiver 1330, and the transceiver 1330 is configured to receive and/or send a signal. For example, the processor 1310 is configured to control the transceiver 1330 to receive and/or send a signal.

In a solution, the sidelink positioning apparatus 1300 is configured to implement operations performed by the terminal device in the foregoing method embodiments.

For example, the processor 1310 is configured to implement processing-related operations performed by the terminal device in the foregoing method embodiments, and the transceiver 1330 is configured to implement transceiver-related operations performed by the terminal device in the foregoing method embodiments.

In another solution, the sidelink positioning apparatus 1300 is configured to implement operations performed by the network device in the foregoing method embodiments.

For example, the processor 1310 is configured to implement processing-related operations performed by the network device in the foregoing method embodiments, and the transceiver 1330 is configured to implement transceiver-related operations performed by the network device in the foregoing method embodiments.

Figure 14:
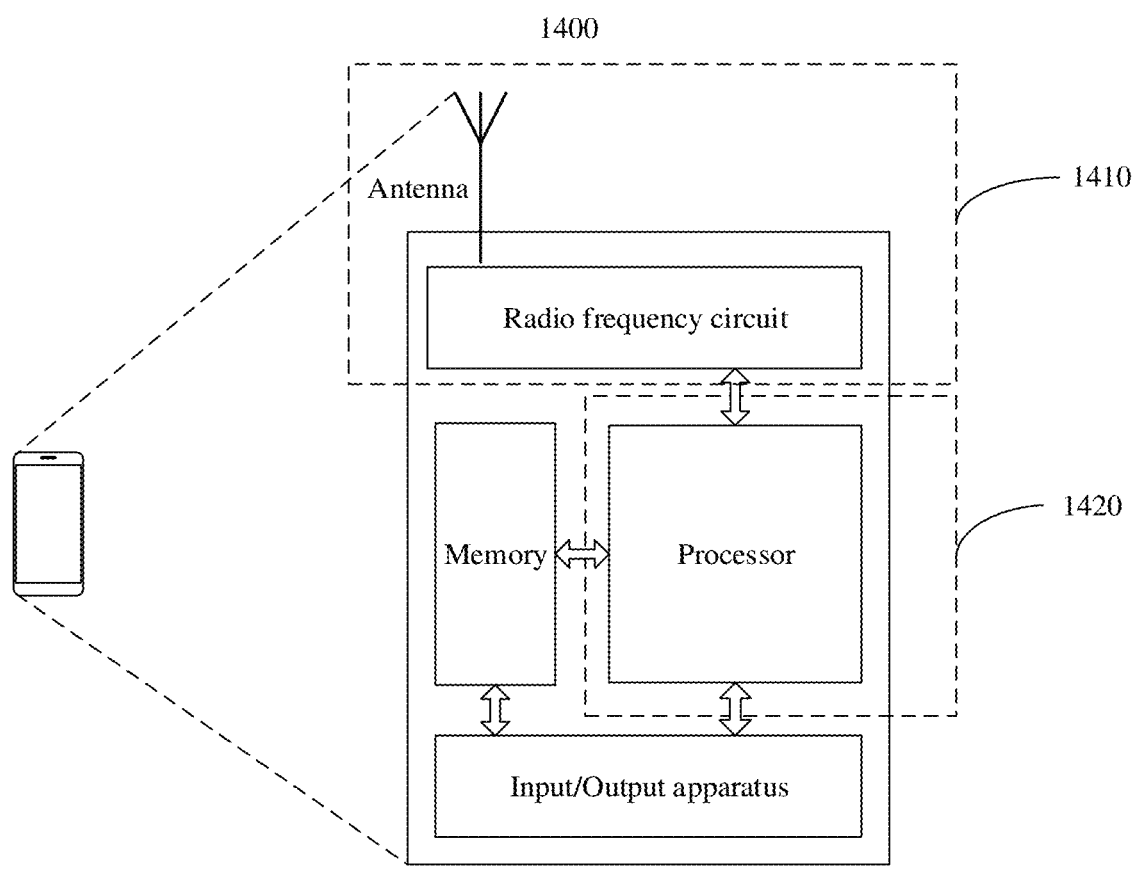
FIG. 14 is a schematic block diagram of a terminal device according to an embodiment of this application.

An embodiment of this application further provides a sidelink positioning apparatus 1400. The sidelink positioning apparatus 1400 may be a terminal device or may be a chip. The sidelink positioning apparatus 1400 may be configured to perform operations performed by the terminal device in the foregoing method embodiments. When the sidelink positioning apparatus 1400 is the terminal device, FIG. 14 is a simplified schematic diagram of a structure of the terminal device. For ease of understanding and illustration, an example in which the terminal device is a mobile phone is used in FIG. 14. As shown in FIG. 14, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is configured to store the software program and the data. The radio frequency circuit is mainly configured to: perform conversion between a baseband signal and a radio frequency signal and process the radio frequency signal. The antenna is mainly configured to receive and transmit a radio frequency signal in an electromagnetic wave form. The input/output apparatus such as a touchscreen, a display screen, or a keyboard is mainly configured to: receive data entered by a user, and output data to the user. It should be noted that terminal devices of some types may have no input/output apparatus.

When data needs to be sent, the processor performs baseband processing on the to-be-sent data, and outputs a baseband signal to the radio frequency circuit. The radio frequency circuit performs radio frequency processing on the baseband signal and then sends a radio frequency signal to the outside in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 14 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the terminal device, and the processor that has a processing function may be considered as a processing unit of the terminal device.

As shown in FIG. 14, the terminal device includes a transceiver unit 1410 and a processing unit 1420. The transceiver unit 1410 may also be referred to as a transceiver, a transceiver machine, a transceiver apparatus, or the like. The processing unit 1420 may also be referred to as a processor, a processing board, a processing module, a processing apparatus, or the like.

Optionally, a component for implementing a receiving function in the transceiver unit 1410 may be considered as a receiving unit, and a component for implementing a sending function in the transceiver unit 1410 may be considered as a sending unit. In other words, the transceiver unit 1410 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

For example, in an implementation, the transceiver unit 1410 is configured to perform receiving operations of the terminal device in FIG. 5 to FIG. 11. The processing unit 1420 is configured to perform processing actions on a terminal device side in FIG. 5 to FIG. 11.

It should be understood that FIG. 14 is merely an example instead of a limitation. The terminal device including the transceiver unit and the processing unit may not depend on the structure shown in FIG. 14.

When the sidelink positioning apparatus 1400 is the chip, the chip includes a transceiver unit and a processing unit. The transceiver unit may be an input/output circuit or a communication interface. The processing unit may be a processor, a microprocessor, or an integrated circuit that is integrated on the chip.

An embodiment of this application further provides a sidelink positioning apparatus 1500. The sidelink positioning apparatus 1500 may be a network device or may be a chip. The sidelink positioning apparatus 1500 may be configured to perform operations performed by the network device in the foregoing method embodiments.

Figure 15:
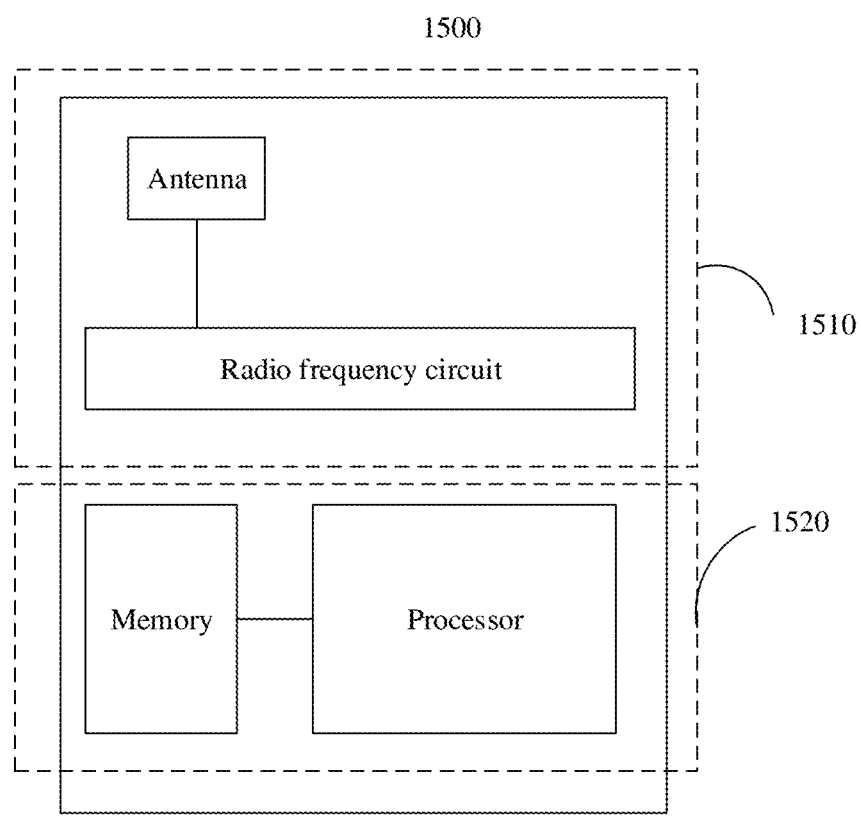
FIG. 15 is a schematic block diagram of a network device according to an embodiment of this application.

When the sidelink positioning apparatus 1500 is the network device, for example, a base station, FIG. 15 is a simplified schematic diagram of a structure of the base station. The base station includes a part 1510 and a part 1520. The part 1510 is mainly configured to: receive and transmit a radio frequency signal, and perform conversion between the radio frequency signal and a baseband signal.

The part 1520 is mainly configured to: perform baseband processing, control the base station, and the like. The part 1510 may be usually referred to as a transceiver unit, a transceiver machine, a transceiver circuit, a transceiver, or the like. The part 1520 is usually a control center of the base station, may be usually referred to as a processing unit, and is configured to control the base station to perform processing operations on a network device side in the foregoing method embodiments.

The transceiver unit in the part 1510 may also be referred to as a transceiver, a transceiver machine, or the like, and includes an antenna and a radio frequency circuit. The radio frequency circuit is mainly configured to perform radio frequency processing. Optionally, a component for implementing a receiving function in the part 1510 may be considered as a receiving unit, and a component for implementing a sending function may be considered as a sending unit. In other words, the part 1510 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 1520 may include one or more boards, and each board may include one or more processors and one or more memories. The processor is configured to read and execute a program in the memory to implement a baseband processing function and control the base station. If there are a plurality of boards, the boards may be interconnected with each other to enhance a processing capability. In an optional implementation, the plurality of boards may share one or more processors, the plurality of boards may share one or more memories, or the plurality of boards may simultaneously share one or more processors.

For example, in an implementation, the transceiver unit in the part 1510 is configured to perform transceiver-related steps performed by the network device in the embodiments shown in FIG. 5 to FIG. 11. The part 1520 is configured to perform processing-related steps performed by the network device in the embodiments shown in FIG. 5 to FIG. 11.

It should be understood that FIG. 15 is merely an example instead of a limitation. The network device including the transceiver unit and the processing unit may not depend on the structure shown in FIG. 15.

When the sidelink positioning apparatus 1500 is the chip, the chip includes a transceiver unit and a processing unit. The transceiver unit may be an input/output circuit or a communication interface. The processing unit is a processor, a microprocessor, or an integrated circuit that is integrated on the chip.

An embodiment of this application further provides a computer-readable storage medium. The computer-readable storage medium stores computer instructions used to implement the method performed by the terminal device or the method performed by the network device in the foregoing method embodiments.

For example, when the computer program is executed by a computer, the computer is enabled to implement the method performed by the terminal device or the method performed by the network device in the foregoing method embodiments.

An embodiment of this application further provides a computer program product including instructions. When the instructions are executed by a computer, the computer is enabled to implement the method performed by the terminal device or the method performed by the network device in the foregoing method embodiments.

An embodiment of this application further provides a communication system. The communication system includes the network device and the terminal device in the foregoing embodiments.

In an example, the communication system includes the network device and the terminal device in the embodiments described above with reference to FIG. 5 to FIG. 11.

For explanations and beneficial effects of related content of any of the sidelink positioning apparatuses provided above, refer to the corresponding method embodiment provided above. Details are not described herein again.

In embodiments of this application, the terminal device or the network device may include a hardware layer, an operating system layer running on the hardware layer, and an application layer running on the operating system layer. The hardware layer may include hardware such as a central processing unit (central processing unit, CPU), a memory management unit (memory management unit, MMU), and a memory (which is also referred to as a main memory). An operating system of the operating system layer may be any one or more computer operating systems that implement service processing by using a process (process), for example, a Linux operating system, a Unix operating system, an Android operating system, an iOS operating system, or a Windows operating system. The application layer may include applications such as a browser, an address book, word processing software, and instant communication software.

A specific structure of an execution body of the method provided in embodiments of this application is not specifically limited in embodiments of this application, provided that a program that records code for the method provided in embodiments of this application can be run to perform communication according to the method provided in embodiments of this application. For example, the method provided in embodiments of this application may be performed by the terminal device or the network device, or may be performed by a functional module that is in the terminal device or the network device and that can invoke and execute a program.

Aspects or features of this application may be implemented as a method, an apparatus or a product that uses standard programming and/or engineering technologies. The term "product" used in this specification may cover a computer program that can be accessed from any computer-readable component, carrier or medium. For example, a computer-readable medium may include but is not limited to: a magnetic storage component (for example, a hard disk, a floppy disk or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive).

Various storage media described in this specification may indicate one or more devices and/or other machine-readable media that are configured to store information. The term "machine-readable media" may include but is not limited to a radio channel, and various other media that can store, contain, and/or carry instructions and/or data.

It should be understood that, the processor mentioned in embodiments of this application may be a central processing unit (central processing unit, CPU), or may be another general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM may be used as an external cache. As an example instead of a limitation, the RAM may include the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

It should be noted that when the processor is a general-purpose processor, a DSP, an ASIC, an FPGA, or another programmable logic device, a discrete gate or a transistor logic device, or a discrete hardware component, the memory (storage module) may be integrated into the processor.

It should be further noted that the memory described in this specification is intended to include, but is not limited to, these memories and any other memory of a suitable type.

A person of ordinary skill in the art may be aware that, in combination with the examples described in embodiments disclosed in this specification, units and steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the protection scope of this application.

It may be clearly understood by a person skilled in the art that, for the purpose of convenient and brief description, for a detailed working process of the foregoing apparatus and unit, refer to a corresponding process in the foregoing method embodiments. Details are not described herein again.

In the several embodiments provided in this application, it should be understood that the disclosed apparatus and method may be implemented in another manner. For example, the described apparatus embodiments are merely examples. For example, division into the units is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other similar forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one unit, or each of the units may exist alone physically, or two or more units are integrated into one unit.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedures or functions according to embodiments of the present invention are all or partially generated. The computer may be a general-purpose computer, a dedicated computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, (SSD)), or the like. For example, the usable medium may include but is not limited to any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
   a transceiver, configured to:
   receive a first sidelink positioning configuration sent by a network device;
   send a first sidelink positioning reference signal to a second terminal device based on the first sidelink positioning configuration, wherein the first sidelink positioning reference signal is used to determine a first measurement value, and the first measurement value comprises a measurement value of the second terminal device on the first sidelink positioning reference signal; and receive, based on the first sidelink positioning configuration, a second sidelink positioning reference signal sent by the second terminal device, wherein the apparatus further comprises a processor, configured to measure the second sidelink positioning reference signal, to obtain a second measurement value, wherein the transceiver is further configured to receive the first measurement value from the second terminal device or the network device, and wherein the processor is further configured to determine a first position of a first terminal device on which the apparatus is disposed based on the first measurement value, the second measurement value, and a second position of the second terminal device.

2. The apparatus according to claim 1, wherein the transceiver is further configured to:

before receiving the first sidelink positioning configuration sent by the network device, send a position information request to the network device.

3. The apparatus according to claim 1, wherein the first sidelink positioning configuration comprises one or more of:

a first time-frequency resource occupied by the first sidelink positioning reference signal, a second time-frequency resource occupied by the second sidelink positioning reference signal, first sequence information of the first sidelink positioning reference signal, second sequence information of the second sidelink positioning reference signal, information about the second terminal device, or reporting configuration information of the first terminal device, and wherein the reporting configuration information of the first terminal device comprises:

(1) the second measurement value, and
(2) a Uu interface measurement reporting method used by the apparatus to report one or more measurement values to the network device.

4. The apparatus according to claim 1, wherein the first measurement value comprises:

a receive-transmit (Rx–Tx) time difference of the second terminal device and a measurement value of the second terminal device on an angle of arrival of the first sidelink positioning reference signal.

5. An apparatus, comprising:

a transceiver, configured to:
receive a second sidelink positioning configuration sent by a network device; and
receive, based on the second sidelink positioning configuration, a first sidelink positioning reference signal sent by a first terminal device; and a processor, configured to obtain a first measurement value based on the first sidelink positioning reference signal; and wherein the transceiver is further configured to:
send the first measurement value to the network device, causing the network device to determine a first position of the first terminal device based on the first measurement value and a second position of a second terminal device on which the apparatus is disposed; or
send the first measurement value to the first terminal device, causing the first terminal device to determine the first position of the first terminal device based on the first measurement value and the second position of the second terminal device.

6. The apparatus according to claim 5, wherein the transceiver is further configured to:

send a second sidelink positioning reference signal to the first terminal device based on the second sidelink positioning configuration.

7. The apparatus according to claim 6, wherein the second sidelink positioning configuration comprises one or more of:

a first time-frequency resource occupied by the first sidelink positioning reference signal, a second time-frequency resource occupied by the second sidelink positioning reference signal, first sequence information of the first sidelink positioning reference signal, second sequence information of the second sidelink positioning reference signal, information about the second terminal device, or reporting configuration information of the second terminal device, and wherein the reporting configuration information of the second terminal device comprises the first measurement value, and wherein the reporting configuration information of the second terminal device further indicates a device-to-device communication (PC5) interface measurement reporting method.

8. The apparatus according to claim 5, wherein the first measurement value comprises:

a receive-transmit (Rx–Tx) time difference of the transceiver and a measurement value of the processor on an angle of arrival of the first sidelink positioning reference signal.

9. The apparatus according to claim 5, wherein the transceiver is further configured to:

send position information of the second terminal device to the network device or the first terminal device.

10. An apparatus, comprising:

a transceiver, configured to:
send a first sidelink positioning configuration to a first terminal device;
send a second sidelink positioning configuration to a second terminal device;
receive a second measurement value sent by the first terminal device, wherein the second measurement value comprises a measurement value of the first terminal device on a second sidelink positioning reference signal sent by the second terminal device, and the second sidelink positioning reference signal is based on the second sidelink positioning configuration; and
receive a first measurement value sent by the second terminal device, wherein the first measurement value comprises a measurement value of the second terminal device on a first sidelink positioning reference signal, and the first sidelink positioning reference signal is based on the first sidelink positioning configuration; and a processor, configured to:
determine a first position of the first terminal device based on the first measurement value, the second measurement value, and a second position of the second terminal device.

11. The apparatus according to claim 10, wherein the first measurement value comprises:

a receive-transmit (Rx–Tx) time difference of the second terminal device and a measurement value of the second terminal device on an angle of arrival of the first sidelink positioning reference signal.

12. The apparatus according to claim 10, wherein the second measurement value comprises:
a receive-transmit (Rx–Tx) time difference of the first terminal device and a measurement value of the first terminal device on an angle of arrival of the second sidelink positioning reference signal.

13. The apparatus according to claim 10, wherein the transceiver is further configured to:
before sending the first sidelink positioning configuration to the first terminal device and sending the second sidelink positioning configuration to the second terminal device, receive a position information request of the first terminal device.

14. The apparatus according to claim 10, wherein the first sidelink positioning configuration comprises one or more of:
a first time-frequency resource occupied by the first sidelink positioning reference signal, a second time-frequency resource occupied by the second sidelink positioning reference signal, first sequence information of the first sidelink positioning reference signal, second sequence information of the second sidelink positioning reference signal, information about the second terminal device, or reporting configuration information of the first terminal device, and wherein the reporting configuration information of the first terminal device comprises the second measurement value, and wherein the reporting configuration information of the first terminal device further indicates a Uu interface measurement reporting method, a Uu interface being an interface between a terminal device and a network device.

15. The apparatus according to claim 10, wherein the second sidelink positioning configuration comprises one or more of:
a first time-frequency resource occupied by the first sidelink positioning reference signal, a second time-frequency resource occupied by the second sidelink positioning reference signal, first sequence information of the first sidelink positioning reference signal, second sequence information of the second sidelink positioning reference signal, information about the second terminal device, or reporting configuration information of the second terminal device, and wherein the reporting configuration information of the second terminal device comprises the first measurement value, and wherein the reporting configuration information of the second terminal device further indicates a device-to-device communication (PC5) interface measurement reporting method.

16. The apparatus according to claim 10, wherein the transceiver is further configured to:
receive position information of the second terminal device sent by the second terminal device.

* * * * *